(12) United States Patent
MacLaren et al.

(10) Patent No.: US 10,769,013 B1
(45) Date of Patent: Sep. 8, 2020

(54) CACHING ERROR CHECKING DATA FOR MEMORY HAVING INLINE STORAGE CONFIGURATIONS

(71) Applicant: Cadence Design Systems, Inc., San Jose, CA (US)

(72) Inventors: John M. MacLaren, Austin, TX (US); Landon Laws, Austin, TX (US); Carl Nels Olson, Austin, TX (US); Thomas J. Shepherd, Cedar Park, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 157 days.

(21) Appl. No.: 16/005,427

(22) Filed: Jun. 11, 2018

(51) Int. Cl.
*G06F 11/10* (2006.01)
*G06F 12/0802* (2016.01)
*G06F 3/06* (2006.01)
*G06F 11/22* (2006.01)

(52) U.S. Cl.
CPC ........ *G06F 11/1064* (2013.01); *G06F 3/0619* (2013.01); *G06F 3/0656* (2013.01); *G06F 3/0659* (2013.01); *G06F 3/0673* (2013.01); *G06F 12/0802* (2013.01); *G06F 2212/1008* (2013.01)

(58) Field of Classification Search
CPC .. G06F 11/1064; G06F 3/0656; G06F 3/0673; G06F 12/0802; G06F 3/0619; G06F 3/0659; G06F 2212/1008
See application file for complete search history.

(56) References Cited

U.S. PATENT DOCUMENTS

| | | | |
|---|---|---|---|
| 4,312,036 A * | 1/1982 | Porter | G06F 9/3802 711/3 |
| 5,398,253 A | 3/1995 | Gordon | |
| 10,474,527 B1 * | 11/2019 | Sun | G06F 11/108 |
| 2008/0195894 A1 * | 8/2008 | Schreck | G06F 11/1056 714/34 |
| 2009/0031188 A1 * | 1/2009 | Miura | G06F 11/1064 714/755 |
| 2013/0179749 A1 * | 7/2013 | Tu | H03M 13/05 714/763 |

(Continued)

OTHER PUBLICATIONS

Kim et al., Extending lifetime of flash memory using strong error correction coding, IEEE, vol. 61, Issue 2, pp. 206-214 (Year: 2015).*

(Continued)

*Primary Examiner* — April Y Blair
*Assistant Examiner* — Dipakkumar B Gandhi
(74) *Attorney, Agent, or Firm* — Schwegman Lundberg & Woessner, P.A.

(57) ABSTRACT

Various embodiments provide for caching of error checking data for memory having inline storage configurations for primary data and error checking data for the primary data. In particular, various embodiments described herein provide for error checking data caching and cancellation of error checking data read commands for memory having inline storage configurations for primary data and associated error checking data. Additionally, various embodiments described herein provide for combining/canceling of error checking data write commands for memory having inline storage configurations for primary data and associated error checking data.

20 Claims, 14 Drawing Sheets

(56) References Cited

U.S. PATENT DOCUMENTS

| | | | |
|---|---|---|---|
| 2014/0068319 A1 | 3/2014 | Daly | |
| 2014/0108889 A1* | 4/2014 | Shaeffer | G06F 11/1048 |
| | | | 714/768 |
| 2014/0177362 A1* | 6/2014 | O'Connor | G06F 11/1052 |
| | | | 365/201 |
| 2014/0229655 A1* | 8/2014 | Goss | G06F 11/1048 |
| | | | 711/103 |
| 2014/0337677 A1 | 11/2014 | Basso et al. | |
| 2019/0050316 A1* | 2/2019 | Kim | G06F 11/3442 |

OTHER PUBLICATIONS

"U.S. Appl. No. 16/022,276, Non Final Office Action dated Oct. 18, 2019", 6 pgs.

U.S. Appl. No. 16/022,276, Examiner Interview Summary dated Jan. 16, 2020, 3 pgs.

U.S. Appl. No. 16/022,276, Notice of Allowance dated Jan. 29, 2020, 5 pgs.

U.S. Appl. No. 16/022,276, Response filed Jan. 14, 2020 to Non Final Office Action dated Oct. 18, 2019, 10 pgs.

\* cited by examiner

CACHING ERROR CHECKING DATA FOR MEMORY HAVING INLINE STORAGE CONFIGURATIONS

TECHNICAL FIELD

Embodiments described herein relate to memory and, more particularly, to systems, methods, devices, and instructions for caching error checking data for memory having inline storage configurations.

BACKGROUND

Memory controllers are generally circuits dedicated to controlling and managing the flow of data written to and read from one or more memory devices. They may be suitably formed as separate devices or integrated with a central processing unit or other main controller, and serve the memory storage and access needs of various software application operations. Memory controllers implement the logic to read from and write to various types of memory devices, examples of which include dynamic random access memory (DRAM), as well as electrically programmable types of non-volatile memory such as flash memory, and the like.

To minimize the consequences of data corruption due to random sources of error, various error checking measures for detection and/or correction are employed in the art for the storage and retrieval of data from memory devices. One example of the various known measures is the use of an Error Correcting Code (ECC) feature for detection or correction of error in data words read from one or more memory devices. An ECC feature is usually used in memory controllers for computing devices that are particularly vulnerable to data corruption, or for computing devices involved in high data rate or other applications where substantial immunity to data corruption is particularly important. ECC features generally involve adding redundant ECC bits to a transmitted data segment (e.g., transmitted to a memory device) according to a predetermined code (of a selected ECC format). These ECC bits are of parity-type, and permit the data segment to be properly recovered at the receiving end (by a receiving/recovery method suitably configured for the given ECC format), even if certain correctable errors were introduced in the transmission or storage of that data segment. The degree to which the errors are correctable would depend on the relevant properties of the particular code being used.

Memory controllers generally transmit, receive, and store data words, and a data word format may be defined by a multiple number of bytes. The multiple data bytes of each data word may be stored in a memory device formed by a plurality of integrated circuit chips, and each data byte may be stored in a different selectable chip of the memory device at the same relative address within each selectable chip.

Some memory controllers are configured for storage of such ECC-protected data according to a sideband ECC storage scheme (or format). A sideband scheme for storing ECC and data bits usually provides for an additional chip (e.g., an ECC chip) in which the ECC byte associated with a given data word's data bytes is exclusively stored. The data word's ECC byte is then stored much like its data bytes—at the same intra-chip address as those data bytes, but in its dedicated sideband ECC chip. For example, in some ECC-protected memory controller applications, a data word may be defined by 72 total bits, segmented into eight 8-bit data bytes and one 8-bit ECC byte (one ECC bit for each of the eight 8-bit data bytes). For such an example (a 72-bit data word formed by 8 data bytes plus 1 ECC byte), the data word is stored across nine selectable chips—eight selectable chips for the data bytes and one selectable chip for the associated ECC byte. Under the sideband ECC storage scheme, memory transactions for reading and writing data to and from memory devices contemplate and support sideband storage of ECC bytes with their associated data bytes (e.g., data words).

Other memory controllers may use a non-sideband ECC memory storage scheme, such as an ECC storage scheme (or format) where ECC-protected bytes are stored inline (along) with their ECC bytes in one or more of chips available on a given memory device. For example, under an inline ECC storage scheme, a portion of the memory storage locations available on a chip of a memory device may be allocated for primary data bytes and the remainder allocated for ECC bytes so that the ECC bytes are stored inline with the primary data bytes. Additionally, a memory controller implementing an inline ECC storage scheme may adapt a memory transaction for inline storage configurations, where different portions of given data words are stored at different intra-chip addresses. In this way, available memory device chips may be shared for data and ECC bit storage according to a wide range of memory space configurations depending on such factors as data word size, the number and layout of available storage cells, and the like. An inline ECC storage scheme may be utilized when ECC protection for memory transactions exists but a memory device is not adequately equipped or configured to support sideband storage of ECC bytes. For example, an inline ECC storage scheme (or feature) can provide ECC protection similar to a sideband ECC memory storage scheme without the sideband ECC memory storage scheme's need to widen the memory data path between a memory controller and a memory device to communicate ECC on dedicated pins alongside memory data (e.g., a 9-byte wide memory interface where 8 bytes of the memory are data and 1 byte is the ECC for the 8 bytes of data).

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
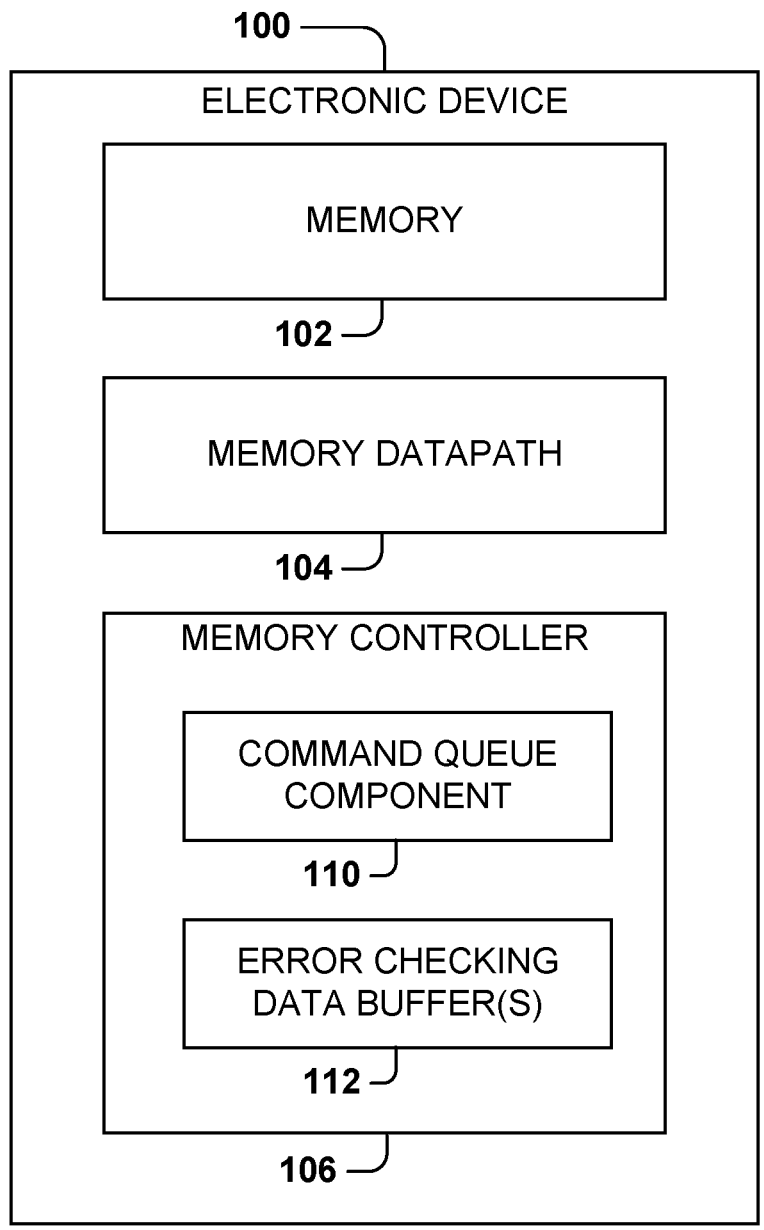
FIG. 1 is a block diagram illustrating an example electronic device that includes a memory controller, in accordance with various embodiments.

Various embodiments provide for caching of error checking data for memory having inline storage configurations for primary data and error checking data for the primary data. In particular, various embodiments described herein provide for error checking data caching and cancellation of error checking data read commands for memory having inline storage configurations for primary data and associated error checking data. Additionally, various embodiments described herein provide for combining/canceling of error checking data write commands for memory having inline storage configurations for primary data and associated error checking data.

As used herein, "primary data" may refer to data that is stored or to be stored on a memory and that is intended to be checked or protected by error checking data. Error checking data for primary data can include ECC data. A memory burst command/operation (or burst mode memory command/operation) may refer to a command/operation that results in repetitious transmission of data a predetermined number of times to result in a memory data path width (DP) times burst length (BL) worth of data, without need to transmit each piece of data in a separate transaction (e.g., a single memory burst read command for a typical central processing unit (CPU) fetches a cache line worth of data). For example, where memory burst command/operation has a burst length of 16 (BL=16) and a 16-bit data path width (DP=16), a single burst command will result in transmission of 256-bits (32 bytes) of data by a single memory transaction, rather than multiple separate memory transactions (e.g., 16 separate 16-bit memory transactions). Accordingly, a memory burst read command/operation performed with respect to a memory can result in the reading (e.g., fetching) of a predetermined number of data words stored on the memory, and a memory burst write command/operation performed with respect to a memory can result in the writing of a predetermined number of data words to the memory. A data word can include a predetermined number of bytes (e.g., 8 bytes for a 64-bit data word).

As used herein, inline primary data addresses refer to memory addresses of a memory that correspond to those segments of the memory that store primary data on the memory. Inline error checking data addresses refer to memory addresses of a memory that correspond to those segments of the memory that store error checking data on the memory.

As used herein, an error checking data address range (e.g., ECC address range) may include all inline error checking data addresses associated with (e.g., that map to) a primary data memory transaction with respect to a range of inline primary data addresses on a memory. For example, an ECC address range with respect to a memory may include all inline error checking data addresses that correspond to error checking data, on the memory, associated with a plurality of primary data memory burst transactions. For instance, with a primary data-to-ECC ratio of 8 to 1, an ECC address range may be associated with a single memory burst worth of ECC data on a memory that covers 8 memory bursts worth of primary data on the memory.

As used herein, an error checking data address range boundary determines when one error checking data address range ends and another error checking data address range begins.

As used herein, an error checking data buffer (e.g., ECC data buffer) may comprise a single storage element that will store a single memory burst reading of error checking data (e.g., ECC data) stored on a memory. For example, the data size of an electronic checking data buffer would be 32 bytes where a single memory burst reading of error checking data results in 32 bytes of electronic checking data being read from the memory. Some embodiments use a plurality of error checking data buffers, where each error checking data buffer may be managed independently.

According to some embodiments, a memory stores primary data inline with error checking data for that primary data at predetermined primary data-to-error checking data ratio (e.g., primary data-to-ECC ratio). As noted herein, using an inline storage scheme for error checking data (e.g., ECC data) can provide error checking data (e.g., ECC) protection similar to a sideband memory storage scheme for error checking data without the sideband memory storage scheme's need to widen the memory data path between a memory controller and a memory to communicate error checking data on dedicated pins alongside memory data. For instance, using an inline storage scheme for error checking data, available memory space of each chip of a memory may be sectioned according to a predetermined primary data-to-error checking data ratio of 8 to 1, such that ⅞th of each chip's available memory space is dedicated for primary data bits, while ⅛th of the memory space is dedicated for error checking data bits (e.g., ECC bits). This can facilitate error checking data protection similar to a sideband memory storage scheme for error checking data that uses a 9-byte wide memory interface between a memory controller and a memory and where 8 bytes of the memory are primary data and 1 byte is the error checking data for the 8 bytes of primary data.

Additionally, for some embodiments, each bit of error checking data (e.g., ECC data) may be associated with error checking/protecting multiple bits of primary data. For instance, 1 bit of error checking data (e.g., ECC data) may error check/protect 1 byte of primary data and, accordingly, 1 byte of error checking data (e.g., ECC data) may error check/protect 8 bytes of primary data, which corresponds to an 8 to 1 primary data-to-error checking data ratio (e.g., primary data-to-ECC ratio). Certain embodiments may have a different primary data-to-error checking data ratio than those discussed herein.

For some embodiments, each read command to the memory is performed as a memory burst commands/operation and, as such, a read command to error checking data (e.g., ECC read command) is performed as a single memory burst command/operation resulting in an amount of error checking data equal to a data path times burst length of the single memory burst command/operation (e.g., 32 bytes of ECC data for DP=16 and BL=16). Accordingly, based on the primary data-to-error checking data ratio used by a memory to store primary data inline with associated error checking data, a single memory burst read of the error checking data from the memory results in error checking data corresponding to multiple continuous memory burst reads of the primary data from the memory. For example, for a memory using a primary data-to-ECC ratio of 8 to 1 for inline storage of primary data with ECC data, a single memory burst read of ECC data stored on the memory can fetch ECC data that corresponds to (e.g., error checks or protects) 8 aligned, memory burst reads of the primary data.

With respect to a memory using a primary data-to-error checking data ratio to store primary data inline with error checking data, some embodiments cache error checking data (e.g., a single memory burst read worth of error checking data) read/fetched in connection with a first memory burst read of primary data. In doing so, some such embodiments enable a subsequent (e.g., second) memory burst read of primary data, associated with the same error checking data address range as the cached error checking data, to use the cached error checking data and avoid or cancel an additional reading/fetching of error checking data from the memory for the subsequent (e.g., second) memory burst read of primary data. In this way, various embodiments obviate the need for an additional reading/fetching of error checking data from the memory by using cached error checking data, which in turn increases efficiency of read and write data traffic with respect to the memory. Such efficiency, for example, may be achieved with respect to applications where reading and writing of primary data is localized to a region of the memory. For instance, an embodiment may increase memory data traffic efficiency where a CPU is operating on a video frame that is multiple times (e.g., four times) the size of a single memory burst command/operation (e.g., read operation) and there are multiple read commands (e.g., four memory burst read commands) executed with respect to the same primary data address range on the memory. In particular, by caching error checking data (e.g., ECC data) as described herein, an embodiment may preserve the error checking data from an initial primary memory burst read. If subsequent primary memory burst reads (e.g., next three memory burst reads of primary data) may hit the same error caching data (e.g., ECC data) fetched during the initial primary memory burst read and cached, the cached error checking data can be utilized and one or more subsequent error checking data memory burst read commands can be avoided/canceled. Such a performance benefit of error checking data caching can depend on the locality of the read and write primary data traffic on the memory.

Some embodiments use error checking data caching and cancellation (or combining of) write memory commands for error checking data in a command queue (CQ). Herein, this is interchangeably referred to as write canceling for error checking data or write combining for error checking data. According to some embodiments, a primary data write command is followed by an error checking data write command for the primary data write command unless one or more subsequent error checking data write commands in the command queue hit the same error checking data buffer (e.g., ECC data buffer) as the error checking data write command. Where the one or more subsequent error checking data write commands in the command queue hit the same error checking data buffer as an error checking data write command currently selected for execution from the command queue, the error checking data write command may be canceled and an error checking data buffer may be allocated for the one or more subsequent error checking data write commands still in the command queue. By canceling the error checking data write command, the one or more subsequent error checking data write commands in the command queue hitting the same error checking data buffer can be postponed until the very last of the subsequent error checking data write commands in the command queue is selected for execution. This effectively combines several error checking data write commands in the command queue hitting the same error checking data buffer. Accordingly, write canceling/combining for error checking data can reduce the number of error checking data write commands executed, which can improve performance of a memory.

According to some embodiments, a memory read transaction for reading primary data from a memory that stores primary data inline with error checking data may have one or more of the following attributes. The memory read transaction is split into multiple primary data read commands and multiple error checking data read commands when the memory read transaction crosses one or more error checking data address range boundaries (e.g., ECC address range boundaries). The memory read transaction results in an error checking data read command for the memory read transaction unless there is a hit to an error checking data buffer (e.g., ECC data already read and stored in an ECC data buffer). If there is no hit to an error checking data buffer, an error checking data buffer (e.g., ECC data buffer) is allocated for the error checking data read command for the memory read transaction, the error checking data read command is eventually executed, and the error checking data fetched as a result of the error checking read command is stored into the allocated error checking data buffer. If there is a hit to an error checking data buffer (e.g., ECC read command hits an ECC data buffer) the error checking data read command for the memory read transaction is canceled and the error checking data stored in the error checking data buffer is used instead. The data read commands and error checking data read commands generated based on the memory read transaction may be placed consecutively in the command queues and may be executed atomically.

According to some embodiments, a memory write transaction for writing primary data from a memory that stores primary data inline with error checking data may have one or more of the following attributes. A memory write transaction not preceded by an error checking data read command (e.g., ECC read) may comprise a partial write that will result in a masked write operation, or a block write operation that spans an entire error checking data block. The memory write transaction is split into multiple primary data write commands and multiple error checking data write commands when the memory write transaction crosses one or more error checking data address range boundaries (e.g., ECC address range boundaries). The memory read transaction results in an error checking data write command for the memory read transaction unless the error checking data write command is canceled (thereby postponed) due to one or more subsequent error checking data write commands in the command queue hitting the same error checking data buffer. If an error checking data write command hits an allocated error checking data buffer (e.g., ECC data buffer) when the error checking data write command is selected for execution from the command queue, the memory write transaction can use the allocated error checking data buffer; otherwise an error checking data buffer can be allocated when the error checking data write command is selected for execution. The data write commands and error checking data write commands generated based on the memory write transaction may be placed consecutively in the command queues and may be executed atomically.

If an error checking data buffer (e.g., ECC data buffer) is hit by a subsequent error checking data write command and the error checking data buffer is allocated for the subsequent error checking data write command, the error checking data buffer may not be written back to a memory and the error checking data buffer may be allocated for the subsequent error checking data write command. The error checking data buffer may be written back to a memory before the error checking data buffer is released.

If an error checking data buffer (e.g., ECC data buffer) is in a partially modified state, a hit may only occur to a subsequent error checking write command in the command queue if that subsequent error checking write command is the next command in the command queue to the same error checking data address range. If an error checking data buffer is in the modified state, a hit can occur to an error checking data read command, but the error checking data may be written back and the error checking data buffer state transitioned to the shared state.

An error checking data buffer (e.g., ECC data buffer) may maintain "valid" or "masks" for each byte of error checking data (e.g., ECC data) stored by the error checking data buffer so that the stored error checking data can be written back to a memory as a masked write operation or so that it can be determined whether data in the error checking data buffer has been updated. The error checking data buffer may contain error checking data from multiple non-contiguous write commands.

Various embodiments relate to electronic design automation (EDA), and to systems, methods, devices, and instructions for generation of circuit design files that comprises a memory controller that supports primary data stored inline with error checking data as described herein, and to integrate the memory controller with a larger integrated circuit comprising different design blocks.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram illustrating an example electronic device 100 that includes a memory controller 106 with error checking data caching, in accordance with various embodiments. The electronic device 100 may comprise any electronic device that uses a memory and a processor, such as a central processor unit (CPU) or a graphics processing unit (GPU). For instance, the electronic device 100 may comprise, without limitation, a computer (e.g., a server computer, a client computer, a personal computer (PC), a tablet computer, a laptop computer, a netbook), a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any electronic device capable of executing instructions with respect to a memory.

As shown, the electronic device 100 includes a memory 102, a memory datapath 104, and the memory controller 106, which performs error checking data caching operations in accordance with various embodiments. Any one or more of the components described may be implemented using hardware (e.g., one or more circuits) alone or a combination of hardware and software. Moreover, any two or more components of the electronic device 100 may be combined into a single component, and the functions described herein for a single component may be subdivided among multiple components.

To avoid obscuring illustrated embodiments with unnecessary detail, various functional components (e.g., components) that are not germane to conveying an understanding of the illustrated embodiments have been omitted from FIG. 1. Various additional functional components may be supported by the electronic device 100 to facilitate additional functionality that is not specifically described herein.

The memory 102 comprises one or more memory cells or memory devices, each of which may comprise some form of random access memory (RAM), such as Dynamic Random-Access Memory (DRAM) or Static Random-Access Memory (SRAM). The memory 102 may be packaged as a single in-line memory module (SIMM) or a dual in-line memory module (DIMM) that can be plugged into an electronic device including an appropriate socket. For some embodiments, the memory 102 comprises Double Data Rate (DDR) Synchronous Dynamic Random-Access Memory (SDRAM), such as Double Data Rate 3 (DDR3), Double Data Rate 4 (DDR4), Low Power Double Data Rate 3 (LPDDR3), or Low Power Double Data Rate 4 (LPDDR4).

The memory datapath 104 comprises one or more electronic signal paths coupling together the memory 102 and the memory controller 106 (e.g., individual lines between pins of the memory 102 and the memory controller 106) such that data, address, command, control, clock, and other information can be carried between the memory 102 and the memory controller 106. For example, the memory datapath 104 may comprise an interconnect, such as a link or a bus. Accordingly, the memory datapath 104 may carry one or more electronic signals between the memory 102 and the memory controller 106. Among the electronic signals carried, the memory datapath 104 may carry one or more data signals for data to be written to, or read from, the memory 102 (e.g., a memory device of the memory 102). Additionally, the memory datapath 104 may carry one or more control signals, which can facilitate writing data to, or reading data from, the memory 102 (e.g., a memory device of the memory 102).

The memory controller 106 manages exchange of data to and from the memory 102 via the memory datapath 104. To facilitate this, the memory controller 106 may exchange data, address, command, control, clock, and other information with the memory 102 over the memory datapath 104.

As shown, the memory controller 106 includes a command queue component 110 and one or more error checking data buffers 112. The command queue component 110 may provide a command queue for storing a plurality of memory commands, generated by the memory controller 106, for timely execution by the memory controller 106. Each of the error checking data buffer 112 may comprise a register or static random-access memory (SRAM). Each of the error checking data buffers 112 may have an error checking data buffer identifier (ID), and may be managed independently of each other.

The memory controller 106 uses split addressing to generate memory commands for memory transactions with respect to the memory 102, and causes primary data to be stored inline with error checking data generated for the primary data on the memory 102. For some embodiments, the primary data is stored on the memory 102 at a range of inline data addresses, and the error checking data is stored on the memory 102 at a range of inline error checking data addresses. For various embodiments, the range of inline primary data addresses does not overlap with (is disjointed with respect to) the range of inline error checking data addresses.

According to various embodiments, the memory controller 106 facilitates error checking data caching and cancellation of error checking data read command in the command queue of the command queue component 110 as described herein. For instance, based on a first memory transaction for reading particular primary data stored on the memory, the memory controller 106 may generate a first read command for reading the particular primary data from the memory and a second read command for reading particular error checking data from the memory. The memory controller 106 may add the first read command and the second read command to the command queue of the command queue component 110. When the memory controller 106 executes one or more commands from the command queue of the command queue component 110, the memory controller 106 may select for execution, from the command queue of the command queue component 110, the second read command for reading the particular error checking data. The memory controller 106 may determine whether the second read command for reading the particular error checking data hits existing error checking data currently stored in one of the error checking data buffers 112. In response to determining that the second read command for reading the particular error checking data does not hit existing error checking data currently stored in one of the error checking data buffers 112, the memory controller 106 may execute the second read command to read the particular error checking data from the memory 102. The memory controller 106 may store, in one of the error checking data buffers 112, the particular error checking data read from the memory 102. In response to determining that the second read command for reading the particular error checking data does hit existing error checking data currently stored in one of the error checking data buffers 112, the memory controller 106 may cancel the second read command and use the existing error checking data currently stored in one of the error checking data buffers 112.

According to various embodiments, the memory controller 106 facilitates canceling/combining write commands for error checking data error in the command queue of the command queue component 110 as described herein. For instance, the memory controller 106 may generate, based on a memory transaction for writing specific primary data to the memory, a first write command for writing the specific primary data to the memory at a subrange of inline primary data addresses and a second write command for writing specific error checking data to the memory at a subrange of inline error checking data addresses. The memory controller 106 may add, to the command queue of the command queue component 110, the first read command and the second read command. When the memory controller 106 executes one or more commands from the command queue of the command queue component 110, the memory controller 106 may select for execution, from the command queue of the command queue component 110, the second write command for writing the specific error checking data. The memory controller 106 may determine whether another write command, for writing other error checking data to the memory, exists in the command queue of the command queue component 110, where the other write command is writing to a same subrange of error checking data addresses as the second write command. In response to determining that the other write command exists in the command queue of the command queue component 110, the memory controller 106 may cancel the second write command for writing the specific error checking data, thereby postponing an error checking data write until at least the other write command (if not a subsequent write command that is writing to the same subrange of error checking data addresses). Additionally, in response to determining that the other write command exists in the command queue, the memory controller 106 may allocate one of the error checking data buffers 112 for future use by at least the other write command in the command queue component 110.

Figure 2A:
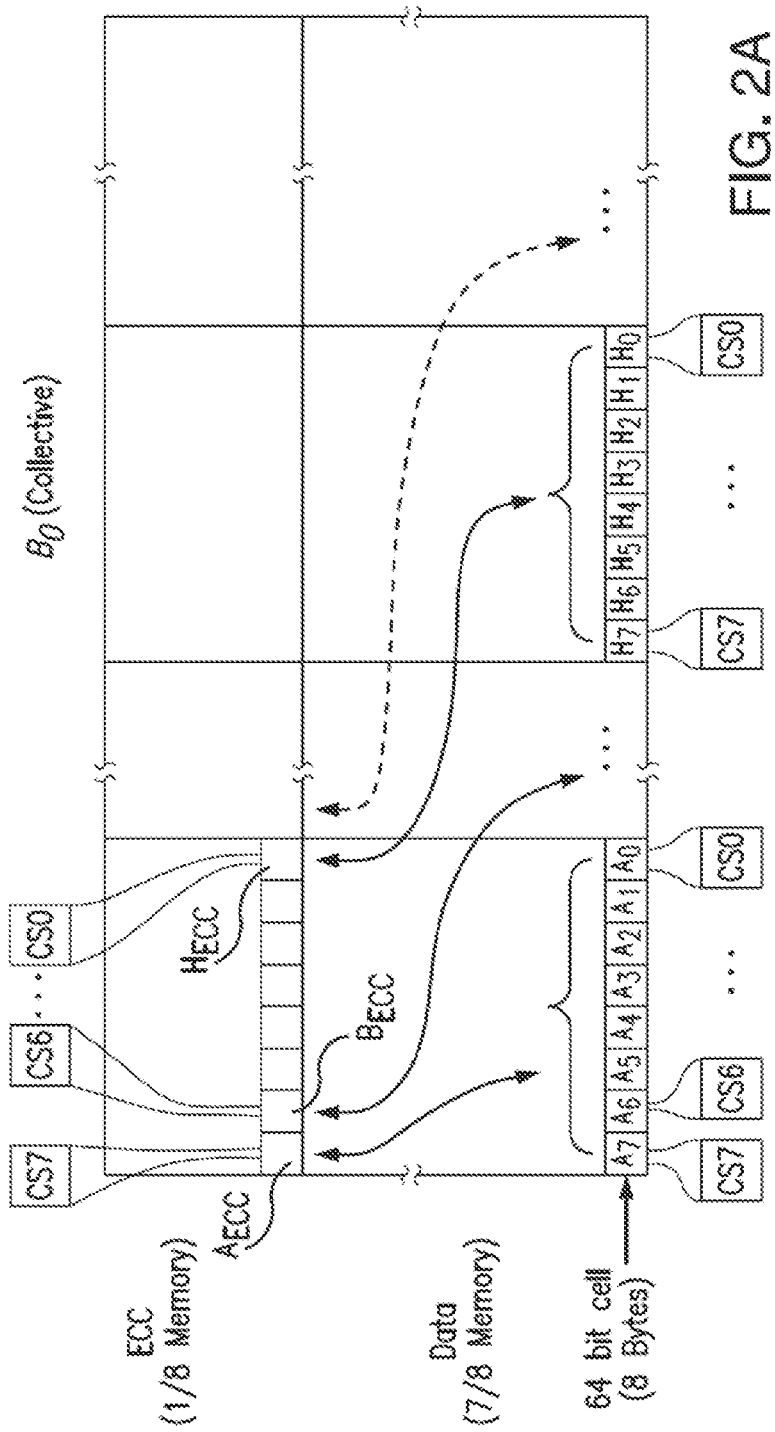
FIGS. 2A and 2B illustrate one example of the numerous ways in which primary data is stored inline with error checking data, in accordance with some embodiments.
Figure 2B:
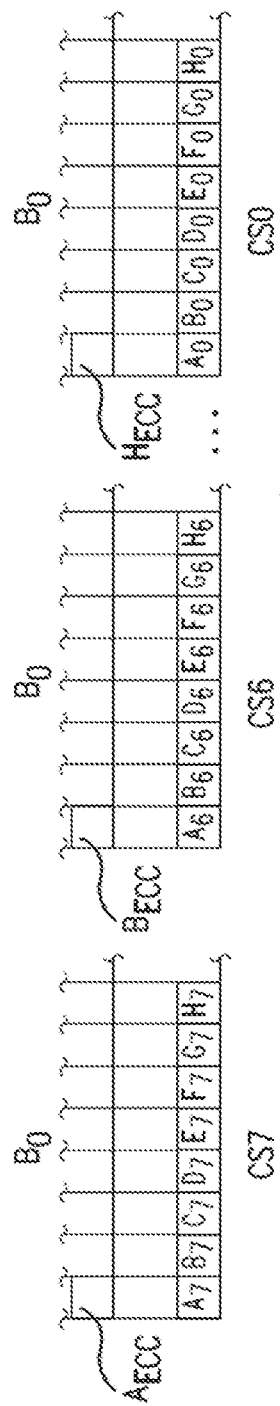

FIGS. 2A and 2B illustrate one example of the numerous ways in which primary data (referenced as "Data" in FIG. 2A) is stored inline with error checking data (referenced as "ECC" in FIG. 2A), in accordance with some embodiments. In this example, a 72-bit data word is employed, but with a memory having just the eight chips CS0-CS7 available to provide the memory space (i.e., lacks benefit of a ninth dedicated sideband chip for ECC data). In the interests of brevity and clarity, the storage of Data and ECC bytes with reference to one bank, namely bank B$_0$, of the chips CS0-CS7, is schematically illustrated. As shown, the available memory space of each chip is sectioned according to a predetermined data-to-ECC ratio. In the illustrated case, a data-to-ECC ratio of 8 to 1 is employed with DRAM chips CS0-CS7, such that $\frac{7}{8}^{th}$ of each chip's available memory space is dedicated for data bits, while $\frac{1}{8}^{th}$ of the memory space is dedicated for ECC bits. In this sense, the available memory space is logically 'partitioned' to store ECC bits in that part of memory not accessible for storage of Data bits. These dedicated partitions, or sections/regions, of memory storage cells may be selectively defined at mutually offset locations in terms of pages and/or banks within a shared chip select.

Although other ratios may be employed depending on the requirements of the particularly intended application, the 8-to-1 ratio illustrated can provide for convenient mutual offsetting of addresses between data and ECC bits stored on the same chip. Adding three digital high values (111) and shifting a row address by 3 bits, for instance, can provide a binary divide-by-8 effect for mapping ECC bits to a consistently offset storage address relative to their corresponding Data bytes.

FIG. 2B illustrates a physical storage scheme for Data and ECC bytes making up a set of data words. Memory data may be transmitted for various applications in bursts containing numerous data words, and this set of data words may, for instance, constitute the data words of the same burst. In the case of Data bytes, the eight Data bytes of each data word in this example may be physically stored in a suitable manner across matching cells of the available chips for convenient logical addressing. When the eight chips CS0-CS7 are available in the illustrated example, the 8-bit Data bytes making up each data word are stored beginning at parallel/matching bank, row, and column locations across the chips CS0-CS7. In FIG. 2B, the set of data words shown—data words A (formed by constituent data bytes $A_7$, $A_6$, $A_5$, $A_4$, $A_4$, $A_2$, $A_1$, $A_0$, in most significant to least significant byte sequence), B, H (formed by data bytes $H_7$-$H_0$)—may be stored in this way within the data section of the given bank.

For example, Data bytes $A_7$-$A_0$ of data word A may each be stored in the respective chips CS7, CS6, CS5, CS4, CS3, CS2, CS1, CS0 at the same matching bank Bo, row, and column locations on the memory. The Data bytes of the next data word B likewise may be stored in the respective chips CS7-CS0 at the same matching bank Bo, row, and column locations of the memory, but one column location over from the Data bytes of the preceding word A. The Data bytes of the other sample data words C-H are similarly stored at matching bank, row, and column locations on the memory, successively located one column over from the preceding data word's Data bytes.

For the 8-bit ECC bytes $A_{ECC}$, $B_{ECC}$, $C_{ECC}$, $D_{ECC}$, $E_{ECC}$, $F_{ECC}$, $G_{ECC}$, $H_{ECC}$ generated by a memory controller of an embodiment for the eight data words A-H, may be physically stored starting preferably from the same chip, bank, and column location aligned with the first stored data byte of the data word A (of the given burst), but offset in row location from that Data byte so as to be disposed in the adaptively established ECC section of the given bank. The ECC byte of the next data word B may then be stored in the same bank of the next chip over, at the first available column location (which matches the column location aligned with the Data byte of the first data word), but offset in row location so as to be disposed in the ECC section of the given bank of the given chip. The ECC bytes of the remaining data words C-H may be similarly stored at corresponding locations in successive ones of the other chips as shown. In certain applications, the bank location within the same chip may be offset as well, so as to optimize performance, since rows/pages of a given bank in many applications may be opened only one at a time.

FIG. 2A illustrates an example logical storage scheme reflecting the physical storage scheme shown in FIG. 2B. In this example, no bank offset is employed between the inline-stored Data bytes and their associated ECC bytes. When the distributed contents of bank Bo across the chips CS0-CS7 of FIG. 2B are combined in the collective bank Bo as shown, the data words A-H are effectively stored in successive 64-bit cells within a row of the data section defined in the collective bank Bo. The eight 8-bit ECC bytes $A_{ECC}$-$H_{ECC}$ associated with those data words A-H may be stored in the 64-bit cell mutually offset from the data word A, so as to be disposed in the ECC section defined in that collective bank Bo. Inline storage may progress in this manner with the Data and ECC bytes of the next set of data words.

Figure 3:
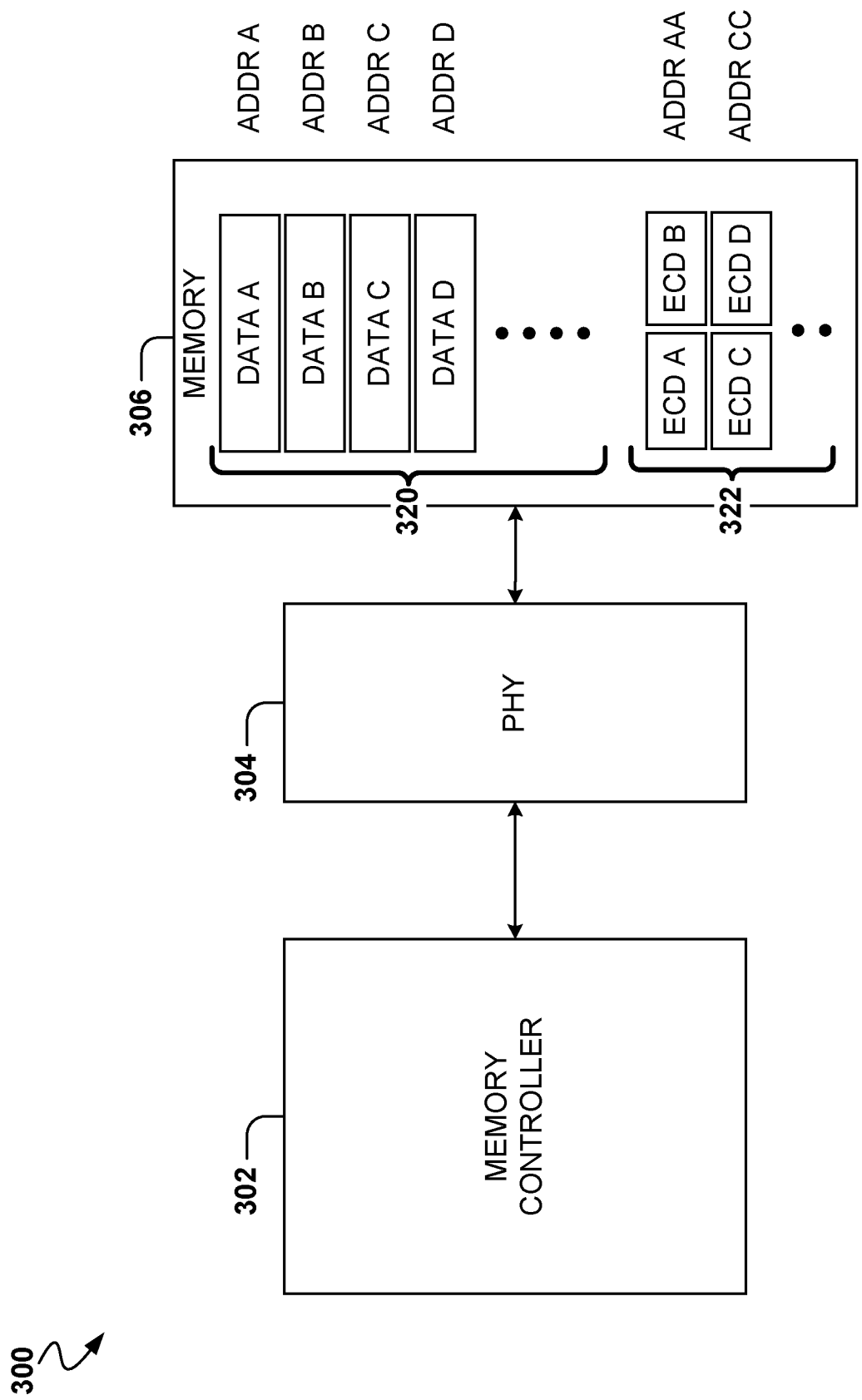
FIG. 3 is a schematic diagram illustrating an example memory system that includes an example memory controller, in accordance with some embodiments.

FIG. 3 is a schematic diagram illustrating an example memory system 300 that includes an example memory controller 302, in accordance with some embodiments. The memory system 300 also includes a physical interface (PHY) 304 and a memory 306 coupled to the memory controller 302 by way of the PHY 304. The memory 306 may comprise one or more memory devices of any suitable type and configuration known in the art, and the PHY 304 may be configured with a suitable interface standard known in the art for the memory 306. As illustrated, the memory 306 stores primary data 320 inline with error checking data 322 associated with the primary data 320. The primary data 320 and error checking data (e.g., ECC data) 322 store the memory 306 for a single memory transaction in two different locations in the memory 306, each of which may be accessed by independent memory commands.

Figure 4:
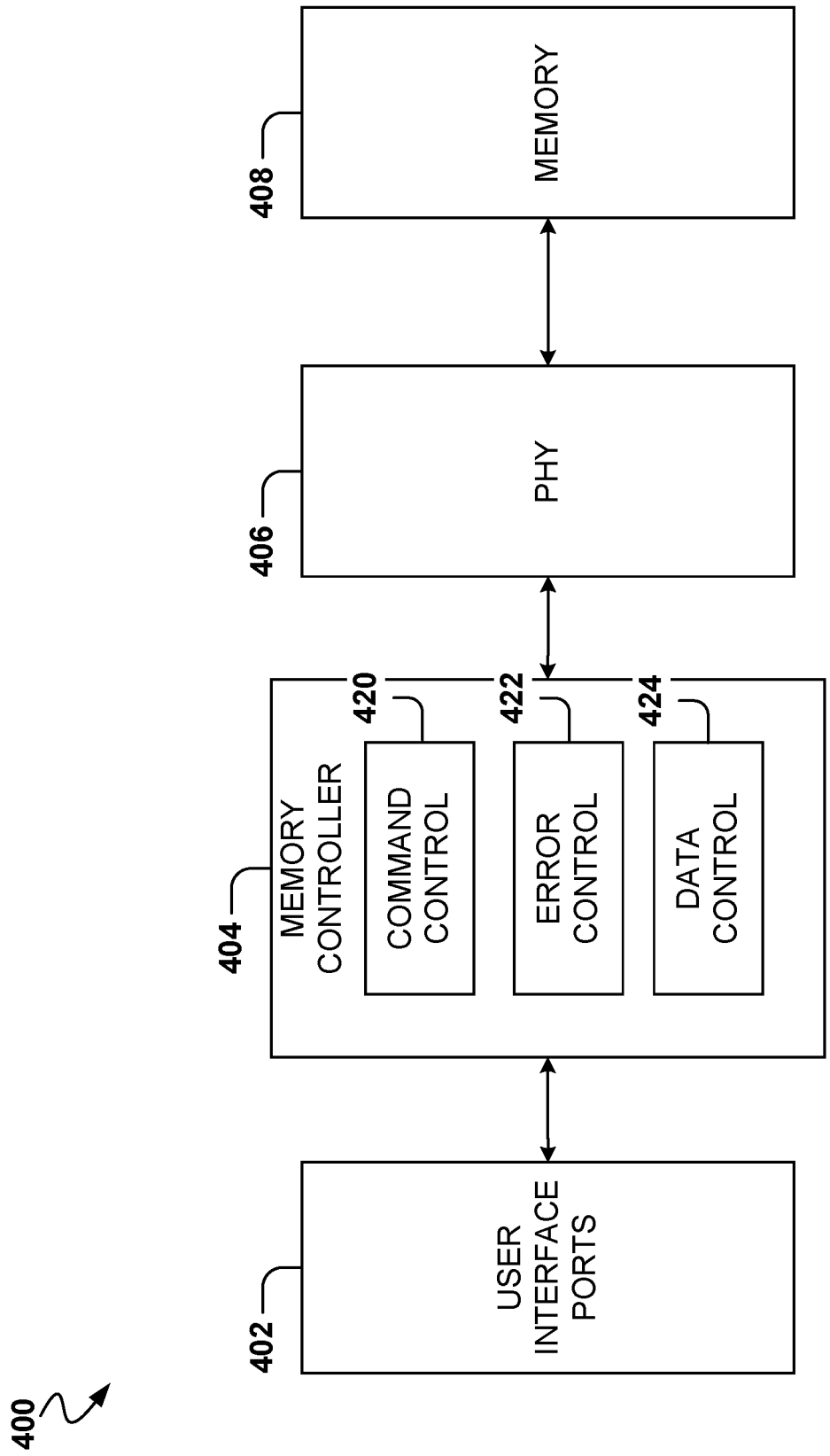
FIG. 4 is a schematic diagram illustrating an example memory system that includes an example memory controller, in accordance with some embodiments.

FIG. 4 is a schematic diagram illustrating an example memory system 400 that includes an example memory controller 404 with caching of error checking data, in accordance with some embodiments. As shown, the memory controller 404 can serve to provide control of a memory 408 (formed by one or more memory devices of any suitable type and configuration known in the art), which can support processing of a master control operation by a master controller (not shown). The memory controller 404 may communicate with a master controller through one or more user interface ports 402, and with the memory device(s) of the memory 408 through a physical interface (PHY) 406, which may be configured with a suitable interface standard known in the art for the memory 408.

The memory system 400 illustrated in FIG. 4 may be implemented in any known form, depending on the particular requirements of an intended application. For instance, the memory system 400 may be realized by discretely interconnected subsystems, or sufficiently integrated in the form of a system-on-chip (SOC) or the like, depending on the particular requirements of the intended application. As the user interface ports 402, the PHY 406, and the memory 408 may be of any suitable type and configuration known in the art, subject to the particular requirements of a given application, no further description is needed for description of features relating to the memory system 400.

In FIG. 4, the memory system 400 includes a command control portion 420, an error control portion 422, and a data control portion 424. In some embodiments, the data control portion 424 includes one or more digital circuits that implement functional logic to carry out a plurality of primary data access operations/commands on the memory 408. Such primary data access operations/commands may include, without limitation, read, write, masked write, and read-modify-write (RMW) operations/commands conducted on selectively addressed storage locations defined in the memory 408. The primary data access operations may include control of additional functions for proper interface with the particular type of memory device(s) employed in the memory 408.

For some embodiments, the error control portion 422 includes one or more digital circuits that implement functional logic for detecting and correcting errors in data segments as stored in memory 408. The error control portion 422 can include execution of error checking data processing, such as ECC processing of predetermined code format (e.g., a format of SECDED type), to detect error in a corrupted primary data segment read from the memory 408. The error control portion 422 is configured to correct the primary data segment read from the memory 408 having an error that is correctable with the given error checking data (e.g., ECC), and report (e.g., for the master control operation) those primary data segment errors which are detected but are not correctable with the given error checking data. The error control portion 422 can also provide intermediate storage of error checking data (e.g., ECC) bytes generated or read in association with primary data bytes during the execution of various primary data access operations, for cooperative transmission with their primary data bytes either to the PHY 406 (for writing operations) or error-checking of retrieved primary data for return to the user interface ports 402 (for reading operations).

The command control portion 420 may be coupled to both the error control and data control portions 422, 424. For some embodiments, the command control portion 420 includes one or more digital circuits that implement functional logic for generating commands to actuate various primary data access operations of the data control portion 424. The command control portion 420 may include one or more suitable units for carrying out memory access operations responsive to memory transactions of user applications involving error checking data-protected data words. These can include address translation and command translation functions involved in adaptively splitting the memory addressing of error checking data (e.g., ECC data) and primary data, which facilitates inline storage of primary data with associated error checking data.

According to some embodiments, the command control portion 420 implements caching error checking data operations described herein with respect to error checking data reads, error checking data writes (write combining for error checking data), or both.

Figure 5:
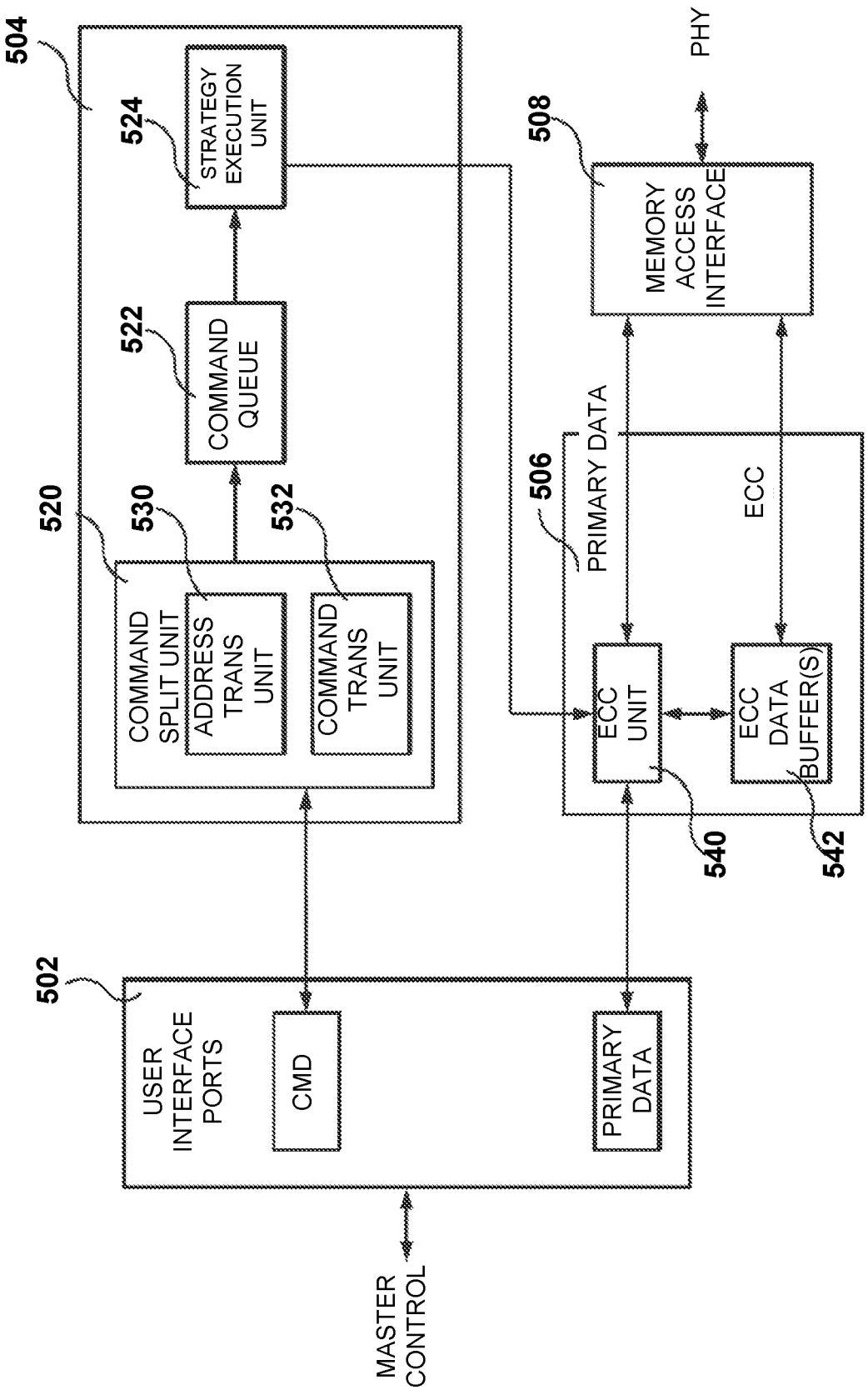
FIG. 5 is a diagram illustrating an example command control portion and an example error control portion of an example memory controller, in accordance with some embodiments.

FIG. 5 is a diagram illustrating an example command control portion 504 and an example error control portion 506 of an example memory controller, in accordance with some embodiments. FIG. 5 is described with respect to ECC data merely for illustrative purposes. Other parts of the command control portion 504, as well as of the error control portions 506, which are not shown or specifically described, may be of any suitable type known in the art configured to suit the particularly intended application. The command control portion 504 may comprise conventional capabilities such as use of control and execution logic for ECC, address shifting between user and memory-specific addresses, and address/command generation for data words.

In FIG. 5, the master control operation may issue memory transactions in the form of memory commands for certain data words to be operated on and the addresses for those data words. The command control portion 504 may receive these addresses and commands (in the master control operation's formatting) through the user interface ports 502. When such addresses and commands are received, the command control portion 504 may execute to determine the proper memory access addresses respectively for the primary data and ECC data portions (upon generation or upon retrieval from memory) of the data words in question. Based on the resulting data and ECC access addresses, the received commands are split (by a command split unit 520) to generate a sequence of multiple memory commands, at least one for the primary data portion, and at least one for the ECC data portion. The data address is suitably translated (by an address translation unit 530) to generate separate, mutually offset data and ECC access addresses, which correspond to separate memory commands for the primary data and ECC data portions of the data words in question. The translated addresses are compatible with the particular inline storage configuration employed, with the primary data and ECC data portions sharing the memory space available on the chips of a memory device (e.g., of the memory 408).

The data words of memory transactions in questions are passed to the error control portion 506. The error control portion 506 includes an ECC unit 540 that implements a suitable error detection and correction technique employing an ECC of predetermined format. The error control portion 506 also includes one or more ECC data buffers 542. During write operations of the memory transactions, associated ECC data portions may be generated for the data words received from the master control operation through the user interface ports 502 by the error control portion 506. The ECC data portions of the data words may be stored in the ECC data buffers 542 until accumulated for all data portions of the given write operation. When drawn from the ECC data buffer 310 thereafter, the associated ECC data portions and the primary data portions emerging from the error control portion 506 at that point may be addressed separately and subjected to separate write commands for mutually offset inline storage on a memory. They may be passed to one or more suitable memory access interface 508 (e.g., of the data control portion 424) for passage to the PHY (e.g., 406).

During read operations of the memory transactions, the separately addressed data and ECC data portions of the data words may be read through separate read commands from their mutually offset inline stored locations on a memory, responsive to the translated data and ECC addresses and memory commands received for execution from the command control portion 504. The primary data portions read from the memory may be passed through the memory access interface 508 to the error control portion 506, and the associated ECC data portions read from the memory may be passed through the memory access interface 508 and stored in the ECC data buffers 542 until the primary data portions of the given read operation are read and ready for error check. The ECC data portions then may be passed from the ECC data buffers 542 to the error control portion 506 for error checking of the associated primary data portions. The checked (and possibly corrected) data words may be returned to the master control operation through the user interface ports 502.

As shown, the command control portion 504 includes a command queue 522 that receives memory commands generated by the command split unit 520, and from which a strategy execution unit 524 draws memory commands for timely execution. The command queue 522 may receive and register memory commands from not only the master control operation (through the user interface ports 502 and the command split unit 520), but also from other functional units not shown. Depending on the embodiment, these include for example a built-in-self-test (BIST) unit, a scrubbing engine, and the like. The command queue 522 may receive and queue up respective primary data and ECC memory commands translated by the command split unit 520 from the command received from the master control operation.

The command split unit 520 may implement functional logic for restructuring and modifying the memory commands and associated addresses it receives. The command split unit 520 may provide the necessary translation of incoming addresses/commands for data words to adaptively suit inline storage of associated ECC (i.e., error checking data) and primary data portions on an available memory. Accordingly, the command split unit 520 may include an address translation unit 530 and a command translation unit 532. The address translation unit 530 may execute to apply a predefined mapping scheme to the data address received in user addressable space, and map to separate addresses in memory addressable space for the primary data portion and for the ECC data portion of each data word. The address translation unit 530 may obtain separate primary data and ECC data access addresses by carrying out address shifting measures to generate addresses in terms of device-specific address parameters of a given memory (e.g., to reflect the row, column, page, or other such storage cell arrangement/organization thereof).

As noted herein, for various embodiments, communication traffic includes memory commands and data that are transmitted in burst mode to facilitate higher data throughput. The command split unit 520 may enforce a predefined burst limit (set to a burst limit) for each memory command entered in the command queue 522. The command split unit 520 may also confirm acceptance of each command entry to the command queue 522 that satisfies the burst limit condition.

The command translation unit 532 may evaluate incoming commands to determine if they include a read, write, or read-modify-write data access operation based on address, length, and availability of data masking. The command translation unit 532 may further evaluate received memory commands to determine if the associated ECC access of the command includes a read, write, or read-modify-write operation based on similar criteria applicable to the ECC access. Based on such determinations, the command split unit 520 can split, or decompose, the received commands into corresponding memory command sequences that are placed in the command queue 522. For inline ECC data (i.e., error checking data) storage, the sequences include additional ECC read and/or write commands that are suitably generated as required from the received commands. The command translation unit 532 may implement suitable logic to split incoming memory commands accordingly into the appropriate set of primary data commands and generate their associated ECC data commands—such as reads, writes, and read-modify-writes. The command queue 522 may implement suitable command placement measures to ensure that memory command sequences containing matched primary data and ECC data commands are executed as in-order sequences that are not interrupted by other memory commands.

The command control portion 504 includes a strategy execution unit 524 coupled to the command queue 522. The strategy execution unit 524 may implement functional logic to select execution memory commands, from memory command entries accepted into the command queue 522, and direct selected memory commands to corresponding parts of the error control portion 506 and a data control portion (e.g., 424) for timely execution. In this way, the strategy execution unit 524 can issue accepted memory command entries of the command queue 522 burst by burst. Additionally, the strategy execution unit 524 can serve to hold a memory command entry under execution.

According to some embodiments, the strategy execution unit 524 implements logic for error checking data caching using the ECC data buffers 542 and cancellation of error checking data read commands from the command queue 522 as described herein. Additionally, for some embodiments, the strategy execution unit 524 implements logic for combining/canceling of error checking data write commands in the command queue 522 as described herein.

Address Mapping/Translation

In order to provide a contiguous address space, the ECC data storage in the memory (e.g., 408) may be mapped out of the primary data address space. With the memory space available in the memory logically partitioned, the ECC data bits may be stored in the upper or lower $1/8^{th}$ region of the memory space within each chip select of the memory. As the ECC data storage space in this dedicated region fills, the addressing may be configured to roll-over from one chip select to the next on a non-power-of-2 boundary. Suitable measures may be used in certain applications to reconcile non-power-of-2 memory to the address granularity needed to support inline ECC storage (e.g., decoding of the upper 3-bits in the address within each chip select). ECC data storage may be performed on a per chip select (CS) basis, such that when the upper 3-bits of the address within a chip select are set to 3'b111 (that is, the 3 binary MSB's are set to the values: 1 1 1), the address points to a location within the partitioned ECC region of the memory space. All other addresses may point to a location within the primary data region of the memory space outside this partitioned ECC region. The primary memory decode may roll over to the next chip select when the $7/8^{th}$ boundary is crossed, and for systems with more than two chip selects, the boundary may use similar decoding at each boundary—$14/8^{th}$ boundary, $21/8^{th}$ boundary, etc. Inline ECC data storage may involve translation of the primary data address to memory device address, which may go beyond just masking, splitting, and/or concatenation of user address bits, as the user address for a specific CS may start at a non-power-of-two page address to avoid gaps in the user address space.

Inline ECC storage may also involve one or more ECC data accesses for each user-initiated command. The address and length of the ECC data accesses may be suitably computed from the user address and length. This can entail translation of the row address, column address, datapath address, and chip level CID (for stacked 3DS devices). The bank address may not be changed, unless a suitable bank offset is selectively enabled for optimized performance.

Command Translation

Read and write commands (representing read and write primary data memory transactions) received at the user interface ports 502 may be from one byte in length to a certain other maximum command length supported by a particular embodiment. Commands may be sub-divided in the command split unit 520 based on factors such as page boundary crossings, wrap commands, read-modify-write commands, etc. For some embodiments, commands are split on ECC address range boundaries (e.g., an 8 primary data memory burst aligned boundary). For instance, the command split unit 520 may split primary data commands such that the ECC data required for the entire command in the command queue 522 is contained in a single memory burst.

The commands involving read and write received through the user interface ports 502 may be translated into a combination of read, write, and read-modify-write operations for both the primary data and ECC data portions of the error-protected data words to be operated on.

Figure 6:
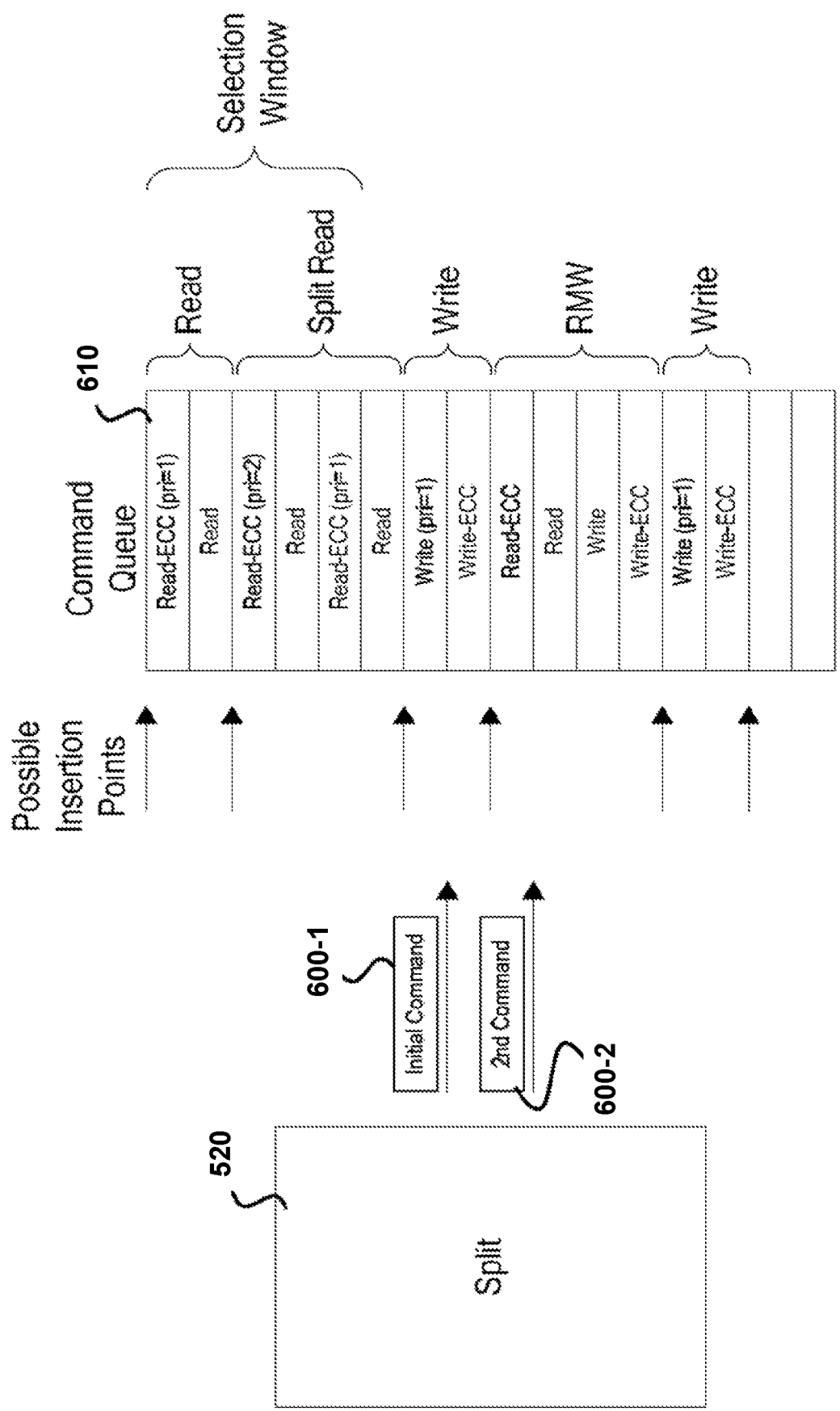
FIG. 6 is a diagram illustrating an example memory command placement and selection in a command queue for inline ECC data storage, in accordance with some embodiments.

FIG. 6 is a diagram illustrating an example memory command placement and selection in a command queue 610 for inline ECC data storage, in accordance with some embodiments. The illustrated command queue 610 at the instant in time shown contains a plurality of memory command sequences, such as Read, Split Read, Write, RMW, and Write command sequences queued up in order. The memory commands translated by the command split unit 520 are provided as a new memory command sequence by an initial memory command 600-1 and a second memory command 600-2. This new memory command sequence may be placed in front of the already queued command sequences' initial memory commands only, as indicated by the arrows pointing to the possible insertion points. Placement in between memory commands within the existing sequences may be precluded. So the initial memory command 600-1 in the new memory command sequence may be placed, subject to the placement rules, at any of the possible insertion points denoted. The second memory command 600-2 of the new memory command sequence may be placed at the entry point immediately following the initial memory command 600-1.

Command selection defines a window of memory commands in the top entries in the command queue 610 that may be evaluated as possible candidates for the next memory command issued to the strategy execution unit 524 from the command queue 610. Command selection may apply predefined rules to determine which memory command to choose.

For inline ECC data storage, the command selection process may be thereby applicable only to selecting between initial memory commands of candidate sequences, with no extraneous consideration needed for subsequent memory commands in the sequence regarding their readiness for execution. Since the selection window may be small (e.g., selection size=4), selection may be often limited to consideration of one or two memory commands.

Command Queue

As noted herein, for some embodiments, a memory burst read of error checking data, stored inline with primary data on a memory and associated with an error checking data address range (e.g., a particular ECC address range), is performed in connection with an initial memory burst read of primary data stored on the memory. The error checking data fetched may be stored (e.g., cached) to an error checking data buffer. Subsequently, the error checking data stored in the error checking data buffer may be shared by a subsequent memory burst read of primary data that shares the same error checking data address range. For some embodiments, memory commands to the same error checking data address range are executed in order. An address conflict logic of a command queue (CQ) may use an error checking data address range to determine an address conflict that enforces an existing order of commands in the CQ to the error checking data address range.

For some embodiments, the address compare logic compares addresses associated with one or more error checking data buffers (e.g., all ECC data buffers) to addresses of one or more command queue (CQ) entries (e.g., all CQ entries) on every clock.

In another embodiment, the address compare logic compares addresses associated with one or more error checking data buffers (e.g., all ECC data buffers) to addresses of one or more command queue (CQ) entries when certain events are detected (e.g., events that justify a comparison). Example events triggering address comparison by the address compare logic may include, without limitation: new command enters CQ; execution of command from CQ; execution of read command from CQ; and execution of write command from CQ. For a new command entering the CQ, the address compare logic may compare the new entry with all valid error checking data buffers. For a command execution event, the address compare logic may compare a current command selected with all error checking data buffers. For a read command execution event, the address compare logic may compare the read command with all CQ entries. For a write command execution event, the address compare logic may compare the write command with all CQ entries. For some embodiments, an address compare logic implements event-driven comparisons using four address comparators: 2×1:ECC_BUFFER_DEPTH, 2×1: CQ_DEPTH. Since the events are not mutually exclusive, an address compare logic may use a separate comparison logic for each event.

The following Table 1 describes example comparisons of error checking data buffers to CO entries based on events.

TABLE 1

| Event | Comparison | Action if valid address match |
|---|---|---|
| New command placement in a CQ entry | Compare new CQ entry address against all Error Checking Data buffer addresses | Any match, transition the Error Checking Data buffer state to the hit state |
| Command execution - read, write or RMW | Compare command address against all Error Checking Data buffer addresses | Read - cancel error checking data read, execute the data read, allocate the Error Checking Data buffer to the read<br>Write - allocate the Error Checking Data buffer to the write<br>RMW-Read - cancel error checking data read, execute the data read, allocate the Error Checking Data buffer to the RMW<br>RMW-Write - always a hit.<br>RMW-Read (error checking data only) - cancel error checking data read (no transaction), allocate the Error Checking Data buffer to the RMW |
| Read/RMW-read command execution | Compare read command address against all valid CQ entries | Any match, transition the Error Checking Data buffer state to the hit state<br>(RMW-read always followed by RMW-write - compare not really necessary) |
| Write/RMW-write command execution | Compare write command address against all valid CQ entries | Any match, transition the Error Checking Data buffer state to the hit state<br>Write command Error Checking Data buffer state Modified:<br>First match is a read - execute the error checking data write and transition Error Checking Data buffer state to shared<br>First match is a write - cancel the error checking data write, Error Checking Data buffer remains in the modified state<br>Partially Modified:<br>First match is a read - execute the error checking data write and transition Error Checking Data buffer state to invalid<br>First match is a write - cancel the error checking data write, the Error Checking Data buffer remains in the partially-modified state |

According to some embodiments, each error checking data buffer (e.g., ECC data buffer) used has two comparators, where the inputs to the comparators come from placement, selection, and the error checking buffer. For some embodiments, each entry in the CQ has an address comparator, where the inputs to the comparator come from selection or strategy logic. Additionally, for some embodiments, all comparator outputs are bit-wise OR'd to determine a single match response.

Figure 7:
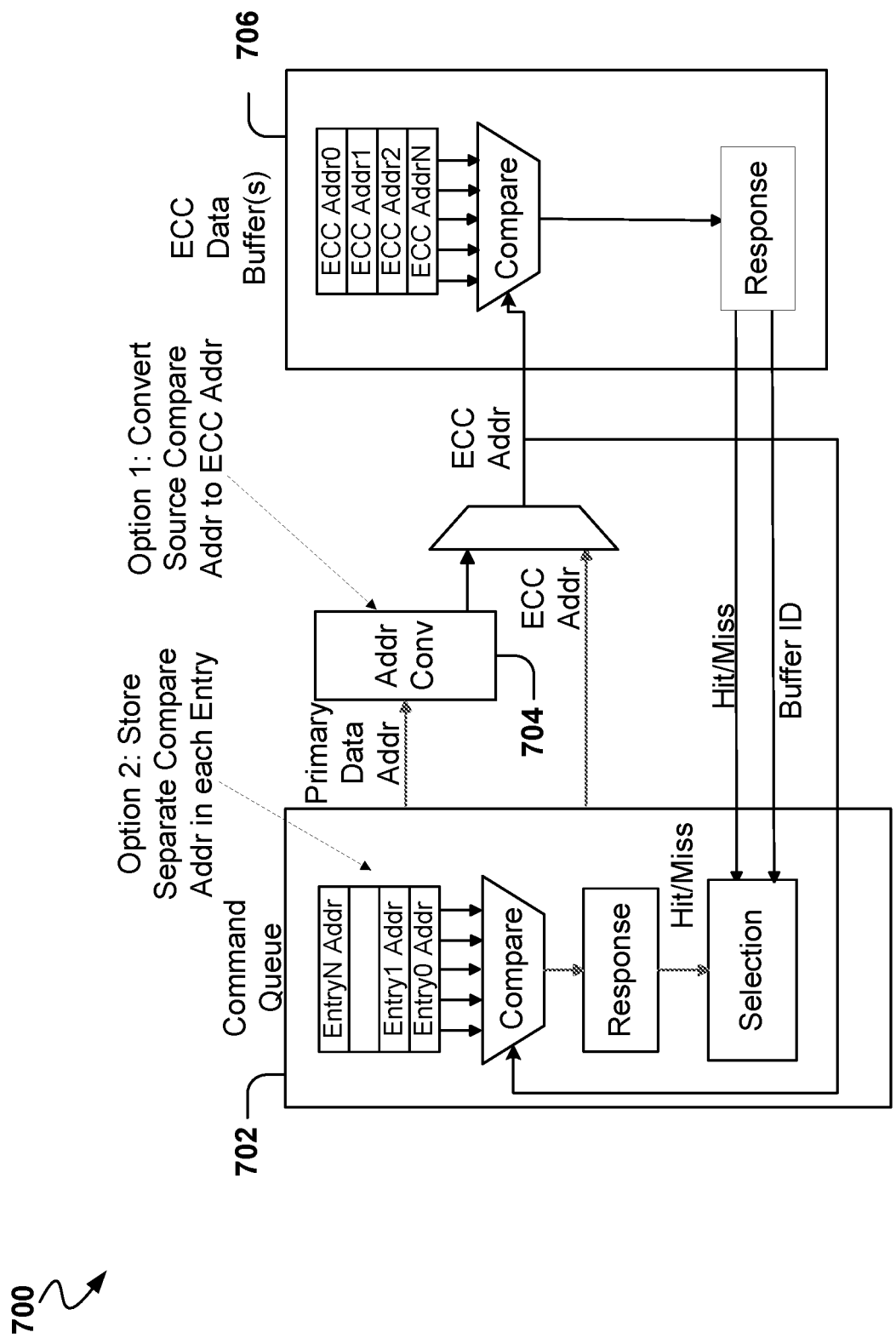
FIG. 7 is a schematic diagram illustrating example address compare logic for comparing addresses of memory commands in a command queue to addresses associated with one or more error checking data buffers, in accordance with some embodiments.

FIG. 7 is a schematic diagram illustrating example address compare logic 700 for comparing addresses of memory commands in a command queue (CQ) to addresses associated with one or more error checking data buffers (e.g., ECC data buffers) to determine if there is a hit to an error checking data buffer (e.g., in a plurality of error checking data buffers), in accordance with some embodiments. As shown, address compare logic 700 includes a command queue 702, an address conversion unit 704, and one or more ECC data buffers 706.

Depending on the embodiment, a compare address (error checking data address) may include one or more of the following: CS (for addressing a selectable chip of the memory device), BG (for addressing the bank group in the selectable chip), bank (for addressing the bank of the bank group), row (for addressing the row of the bank), and column (for addressing the column of the row). As disclosed herein, a primary data address and an error checking data address for a command sequence may be different. For instance, the CS may be the same for the primary data address and error checking data address, but the bank may be rotated, and the row and column addresses may be shifted. The lowest column address bit and BG0, if applicable, may be masked off for the compare such that the comparison is limited to the burst aligned address range (e.g., 8 burst aligned address range).

For various embodiments, an atomic sequence of commands in the CQ (e.g., sequence of primary data and error checking data commands generated for a single memory transaction) maps to the same error checking data buffer (e.g., ECC data buffer). Accordingly, for comparison purposes, the address associated with the first command in the atomic sequence may be the only address compared against the address associated with an error checking data buffer to determine whether a hit exists with respect to the error checking data and the atomic sequence of commands.

For some embodiments, address comparisons are performed on the error checking data address (inline error checking data address). Memory command sequences in the CQ may include both primary data addresses (inline primary data addresses) and error checking data addresses (inline error checking data addresses). If data entries in the CQ do not store a copy of the error checking data address, the compare may be performed for error checking data commands only. Compare requests may be made with an error checking data address.

Referring now to FIG. 7, depending on the embodiment, comparison of error checking data addresses (e.g., ECC addresses) may be performed by one of several ways using the address compare logic 700. For example, one way comprises converting a source primary data address to an ECC address by an address conversion unit 704 and comparing the resulting ECC address to all destination ECC addresses at the ECC data buffers 706. For the ECC data buffers 706, all buffer compare addresses may be ECC addresses. For comparisons at the command queue 702, addresses may be compared to ECC data command entries, which each have a corresponding ECC data command. As another example, an ECC address may be stored in each entry in the command queue 702, which the address compare logic 700 will then use for all comparisons.

For some embodiments, a command placement logic (e.g., of the command control portion 504) detects when a new memory command enters the command queue 702 (i.e., command placement occurs) and sends a compare address and a compare signal on a clock. The ECC data buffers 706 may compare the placement compare address with all ECC addresses at the ECC data buffers 706. A match at the ECC data buffers 706 may occur when the address associated with one of the ECC data buffers 706 matches the placement compare address and the matching ECC data buffer does not have an "INVALID" state. In the event of a match between the placement compare address and one of the ECC data buffers 706, the state of the matching ECC data buffer may transition to a "HIT" state.

For some embodiments, a command selection logic (e.g., of the command control portion 504) detects when a new memory command is selected for execution from the command queue 702 (e.g., when a new memory command reaches the top of the command queue 702) and sends a compare address and a compare signal. The new memory command may be a memory command newly placed on the command queue 702 or the next command to move up the command queue 702. The ECC data buffers 706 may compare the placement compare address with all ECC addresses at the ECC data buffers 706. If the selection compare address matches with an address associated with one of the ECC data buffers 706, the matching ECC data buffer may be allocated to the command. Additionally, if the selection compare address matches with an address associated with one of the ECC data buffers 706, response logic of the ECC data buffers 706 may provide a hit response to the command selection logic and may provide a buffer identifier for the matching ECC data buffer to the command selection logic. If no match occurs, one of the ECC data buffers 706 may be allocated based on a buffer assignment algorithm (e.g., round robin algorithm described herein). Additionally, if no match occurs, response logic of the ECC data buffers 706 may provide a miss response to the command selection logic. Based on a hit response from the ECC data buffers 706, the command selection logic may cancel (e.g., invalidate) an ECC read command at the top of the command queue 702 that is followed in the command queue 702 by a primary data read command (which happens to be associated with the ECC read command), and the command selection logic may execute the primary data read command from the next entry of the command queue 702.

For some embodiments, a command selection logic (e.g., of the command control portion 504) detects when a read command or a write command is selected for execution from the command queue 702 (e.g., when a new memory command reaches the top of the command queue 702) and sends a compare address and a compare signal to the command queue 702. The command queue 702 may compare the selection compare address with all valid entries of the command queue 702. If a command queue entry match occurs (e.g., with one or more entries), response logic of the command queue 702 may provide a hit response to the command selection logic and the command type for the first command in the command queue 702 that matched. The matching command entry (or entries) may remain unchanged. Additionally, based on hit response from the command queue 702, the assigned ECC data buffer may transition to a "HIT" state. Additionally, based on hit response from the command queue 702, if the first command in the command queue 702 to match is a write command, the write command may be canceled. For some embodiments, all memory commands, except consecutive read commands, to the same ECC data buffer are placed and executed in order.

For various embodiments described herein, error checking data buffer caching (e.g., ECC data buffer caching) results in error checking data read commands being canceled, and error checking data write combining (e.g., ECC write combining) results in error checking data read write commands being canceled. To avoid delays that may result in memory inefficiencies from error checking data command canceling, various embodiments determine whether an error checking data command (e.g., ECC data command) will be canceled or executed on a clock prior to selecting the next memory command for execution from a command queue. For instance, where memory read and write commands are selected from a command queue for execution on every two clocks, the one idle clock between may be used to compare and cancel error checking data read or write commands as described herein.

Error Checking Data Buffer

For some embodiments, a plurality of error checking data buffers (e.g., 8 to 32 ECC data buffers for a total storage of 256 to 1024 bytes of ECC data) is used to store error checking data after an initial memory burst read command to error checking data stored on a memory. A given error checking data buffer may store error checking data for a particular error checking address range (e.g., ECC address range), and may continue to do so until the given error checking data buffer needs to be released for another memory burst read command to error checking data (stored on a memory) that is associated with a different error checking data address range (e.g., different ECC address range). Depending on the embodiment, the number of error checking data buffers used may be user-defined, and may be defined by a user based on storage area and data performance factors.

For some embodiments, each error checking data buffer used has a data size sufficient to entirely store at least one memory burst read worth of error checking data. For instance, for a data path of 16 bits (DP=16) and a burst length of 16 (BL=16), a particular error checking data buffer (e.g., ECC data buffer) may have a data size of 32 bytes.

For some embodiments, a given error checking data buffer comprises at least one of a register or static random-access memory (SRAM). A given error checking data buffer may be one of a plurality of error checking data buffers, and each error checking data buffer in the plurality of error checking data buffers may have an error checking data buffer identifier (ID).

For storing primary data inline with error checking data, the primary error checking data and its associated error checking data are stored in different locations (e.g., at different intra-chip addresses) within a memory. Accordingly, for various embodiments, error checking data read and write memory burst commands are executed separately from primary data read and write memory burst commands.

Depending on the embodiment, error checking data buffers (e.g., ECC data buffers) may be allocated and de-allocated on a memory-transaction by memory-transaction basis. A single error checking data buffer may be allocated at the time of command execution. Additionally, depending on the embodiment, a certain memory command may have an error checking data buffer pre-allocated by a previous memory command or may hit an existing error checking data buffer. For some embodiments, the maximum number of error checking data buffers (e.g., ECC data buffers) that may be in an "ALLOCATED" state for RMW's and write combining are limited to prevent over-allocation of the error checking data buffers.

Some embodiments use different error checking data buffer states (e.g., ECC data buffer states) to facilitate error checking data caching as described herein. In particular, using different error checking data buffer states may enable an error checking data buffer to be allocated or de-allocated, which enables buffer management for error checking data caching. More regarding error checking data buffer states is discussed herein with respect to FIG. 8.

Figure 8:
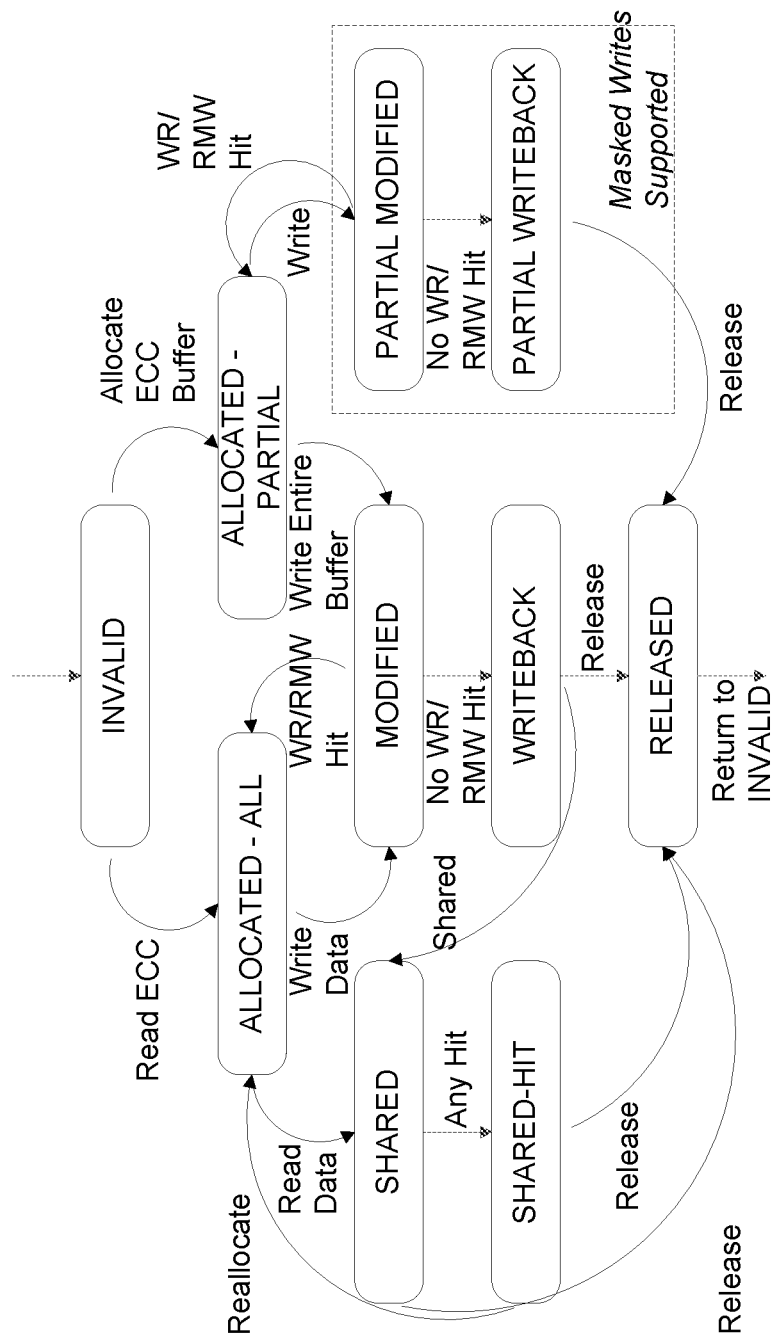
FIG. 8 is a state diagram illustrating states and state transitions of an error checking data buffer, in accordance with some embodiments.

FIG. 8 is a state diagram 800 illustrating states and state transitions of an error checking data buffer, in accordance with some embodiments. The following Table 2 describes example error checking data buffer states that may be used by some embodiments, and that are included in the state diagram 800 of FIG. 8.

TABLE 2

| Error Checking Data buffer state | Description |
| --- | --- |
| Invalid | This state can represent that an Error Checking Data buffer (e.g., ECC data buffer) is not allocated; current error checking data (e.g., ECC data) stored in the Error Checking Data buffer is invalid. When an Error Checking Data buffer is invalidated, it may be cleared. |
| Allocated - All | This state can represent that an Error Checking Data buffer is allocated to one or more memory commands, and the error checking data stored in the Error Checking Data buffer fills the entire Error Checking Data buffer. In this state, the Error Checking Data buffer may not be released. This state may apply to memory reads, memory read-modify-writes (RMWs), memory writes that span an entire error checking data address range, and memory writes that do not span the entire error checking data address range and hit an already filled Error Checking Data buffer. If multiple memory commands are executed to the Error Checking Data buffer, the Error Checking Data buffer may remain in the allocated state until all of the memory commands complete. |
| Allocated - Partial | This state can represent that an Error Checking Data buffer is allocated to a memory command, and the error checking data stored in the Error Checking Data buffer only partially fills the Error Checking Data buffer. In this state, the Error Checking Data buffer may not be released. This state may apply to memory writes that do not span an entire error checking data address range. If multiple memory commands are executed to the Error Checking Data buffer, the Error Checking Data buffer may remain in the allocated state until all of the commands complete. |
| Shared | This state can represent that an Error Checking Data buffer has error checking data that is identical to the error checking data stored in memory. The error checking data may be used for a memory read, memory write, or memory RMW. The Error Checking Data buffer may be released without writing the error checking data stored in the Error Checking Data buffer back to memory. |
| Modified | This state can represent that an Error Checking Data buffer has error checking data that is more recent than the error checking data stored in memory. The error checking data may be used for a memory read, memory write, or memory RMW. For some embodiments, the error checking data stored in the Error Checking Data buffer is written back to memory before the Error Checking Data buffer is released. |
| Partial Modified | This state can represent that an Error Checking Data buffer has error checking data that is more recent than the error checking data stored in memory, and that some of the data is not valid. The error checking data stored in the Error Checking Data buffer may be used for another memory write. For some embodiments, the error checking data stored in the Error Checking Data buffer is written back to memory before the Error Checking Data buffer is released. |
| Shared-Hit | This state can represent that an Error Checking Data buffer is in the shared state and another memory command in the command queue (CQ) is targeting the same error checking data address range associated with the data stored in the Error Checking Data buffer. |
| Writeback | This state can represent that an Error Checking Data buffer is in the modified state, and the error checking data stored in the Error Checking Data buffer is being written back to memory. |

TABLE 2-continued

| Error Checking Data buffer state | Description |
| --- | --- |
| Partial Writeback | This state can represent that an Error Checking Data buffer is in the partial-modified state, and the error checking data stored in the Error Checking Data buffer is being written back to memory. |
| Released | This state can represent that an Error Checking Data buffer is released or scheduled for release. |

According to some embodiments, an error checking data buffer (e.g., ECC data buffer) in an "allocated" state is not released until one or more commands that allocated the error checking data buffer have been executed or completed. Once an error checking data buffer is allocated, one or more additional memory commands may hit the same error checking data buffer (i.e., the one or more additional memory commands hit the error checking data address range associated with error checking data currently stored in the error checking data buffer).

For write and read-modify-write memory commands that require an error checking data read (e.g., ECC read), the error checking data read and data write commands may be separated by several memory commands, which may in turn necessitate proper error checking data buffer allocation to prevent an error checking data buffer resource issue.

For some embodiments, once the initial memory command (e.g., initial memory burst read command) targeting an error checking data buffer is complete, the error checking data buffer is available for reuse by a subsequent memory command (e.g., subsequent memory burst read command) that hits the error checking data address range (e.g., ECC address range). If the error checking data buffer is in a Valid state or a Modified state (as described in Table 2), memory reads, memory writes, or both may reuse the error checking data buffer. If the error checking data buffer is in a Partial Modified state (as described in Table 2), only writes may reuse the error checking data buffer. An error checking data buffer in an Allocated-Partial state or a Partial state may transition to a Modified state if the entire contents of the error checking data buffer are written. An error checking data buffer in a "Hit" state may be given priority by the error checking data buffer release algorithm to be retained. An error checking data buffer in a Modified state or Partial Modified state may be written back to memory prior to releasing the error checking data buffer.

An error checking data buffer that is hit by a subsequent memory command (e.g., subsequent memory burst read command) in the Command Queue (CQ) may be released prior to reuse. Accordingly, memory commands entering the CQ may generate all memory commands in a sequence regardless of whether the error checking data is currently in an error checking data buffer. The memory commands (e.g., memory burst read commands) to error checking data stored on a memory can be canceled when the memory command is selected and the error checking data buffer has been allocated for the memory command. Subsequently, an error checking data buffer may be released according to the release algorithm.

Figure 9:
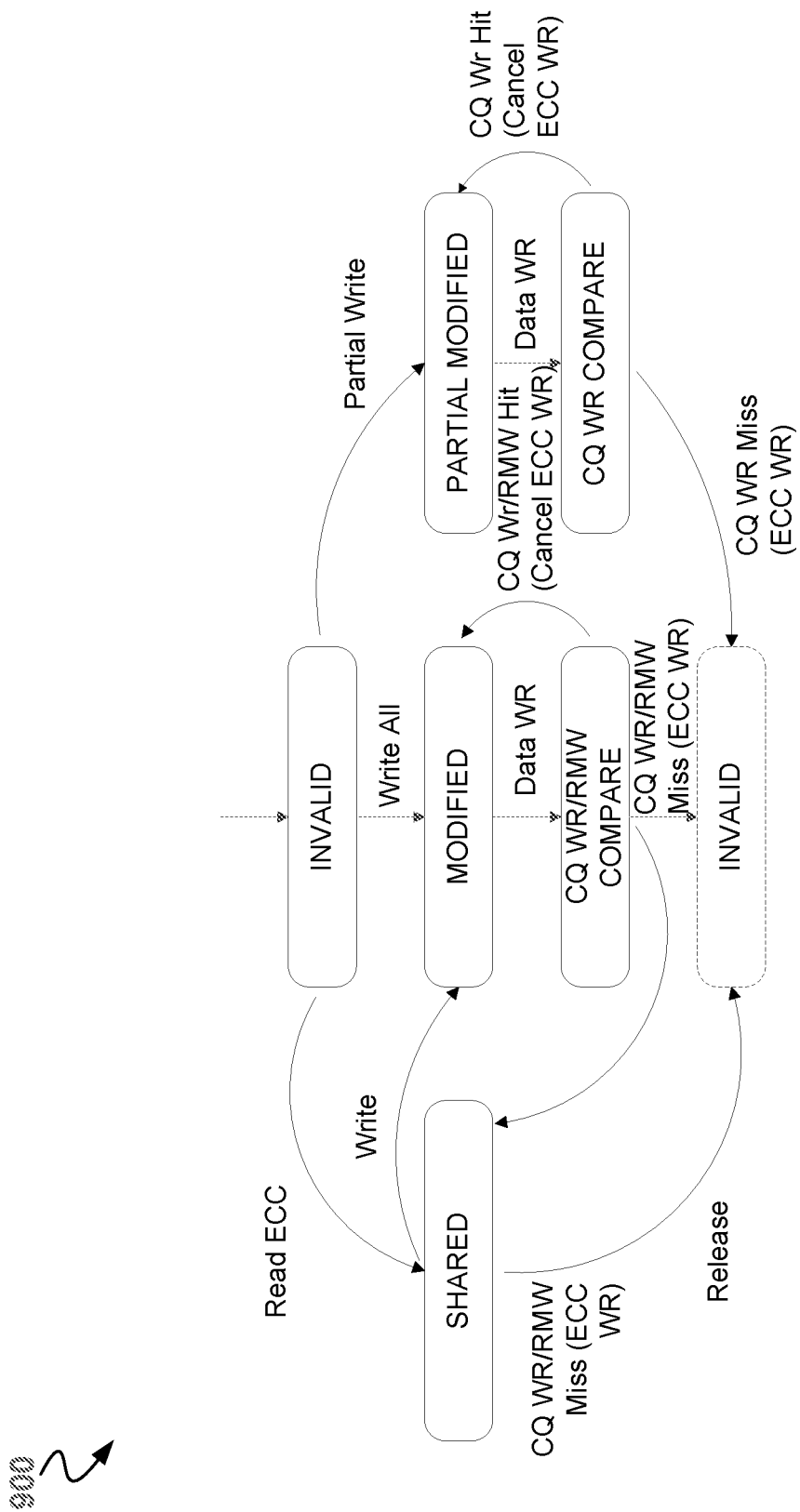
FIG. 9 is a state diagram illustrating an example caching algorithm for an error checking data buffer that enables error checking data to be used for multiple memory transactions that access the same memory burst aligned address range, in accordance with some embodiments.

FIG. 9 is a state diagram 900 illustrating an example caching algorithm for an error checking data buffer that enables error checking data to be used for multiple memory transactions that access the same memory burst aligned address range (e.g., 8 memory burst aligned address range), in accordance with some embodiments. According to some embodiments, the states of state diagram 900 track the states of the state diagram 800 described above with respect to FIG. 8. Depending on the embodiment, the state information of the state diagram 900 may be used for error checking data buffer compare responses (e.g., ECC data buffer compare responses), error checking data buffer compare requests (e.g., ECC data buffer compare requests), error checking data memory command execution (e.g., ECC data command execution), and error checking data memory command canceling (e.g., ECC data command canceling).

With respect to the state information of the state diagram 900, an "INVALID" state can represent that the error checking data buffer does not have valid error checking data (e.g., ECC data) and is currently available to be allocated to a new transaction. A "SHARED" state can represent that the entire error checking data buffer has valid error checking data that is equivalent to the data stored on the memory. A "MODIFIED" state can represent that the entire error checking data buffer has valid error checking data that is more recent than the data stored on the memory. A "PARTIAL MODIFIED" state can represent that the error checking data buffer has some valid error checking data that is more recent than the data stored on the memory.

A "CQ WR/RMW COMPARE" state can cause issuance of an address compare request between an address associated with the error checking data buffer and the addresses associated with one or more CQ entries. If the first match of the requested compare is a write or RMW memory command, the error checking data write command (e.g., ECC write command) may be canceled and the state diagram 900 stays in a "MODIFIED" state. If the first match of the requested compare results in no match, the error checking data write command (e.g., ECC write command) may be executed and the state diagram 900 transitions to either a "RELEASED" state or a "SHARED" state.

A "CQ WR COMPARE" state can cause issuance of an address compare request between an address associated with the error checking data buffer and the addresses associated with one or more CQ entries. If the first match of the requested compare is a write memory command, the error checking data write command (e.g., ECC write command) may be canceled and the state diagram 900 stays in a "MODIFIED" state. If the first match of the requested compare results in no match, the error checking data write command may be executed and the state diagram 900 transitions to either a "RELEASED" state or a "SHARED" state.

A "SHARED" state may be entered on an error checking data read command (e.g., ECC read command) or an error checking data write command (e.g., ECC write command) to write back modified data to the memory. Following an error checking data write command from a "MODIFIED" state, the state diagram 900 can transition to the "SHARED" state. From the "SHARED" state, any command may reuse the error checking data buffer and, if necessary, the state diagram 900 will transition accordingly. While in the "SHARED" state, if the error checking data buffer is not allocated, the error checking data buffer may be released at any time. While in the "SHARED" state, the hit logic may prioritize the release of buffers targeted by commands in the CQ versus untargeted error checking data buffers.

A "MODIFIED" state may be entered on RMW error checking data read command (e.g., RMW ECC read command), a primary data write command that spans an entire error checking data address range (e.g., ECC address range), or a write to an error checking data buffer in a "SHARED" state.

Figure 10A:
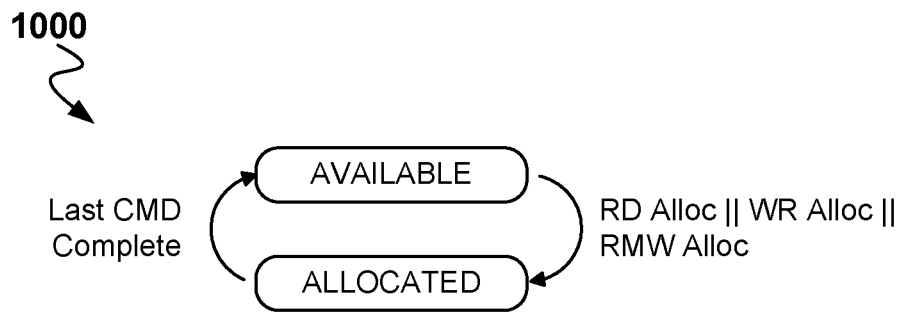
FIGS. 10A through 10C are state diagrams illustrating example state and state transitions for an error checking data buffer, according to some embodiments.
Figure 10B:
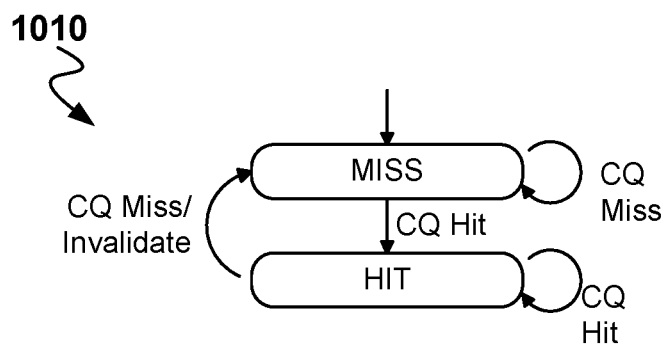
Figure 10C:
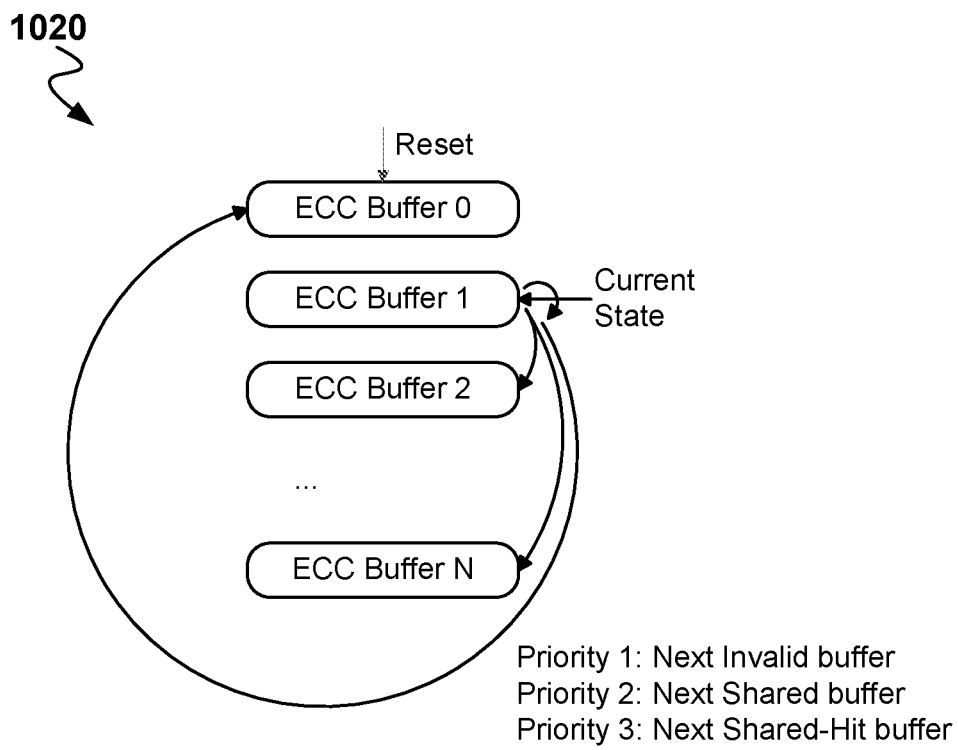

FIGS. 10A through 10C are state diagrams illustrating example state and state transitions for an error checking data buffer (e.g., ECC data buffer), according to some embodiments. In particular, FIG. 10A is a state diagram 1000 illustrating example state and state transitions for allocating an error checking data buffer (e.g., from a plurality of error checking data buffers), for a memory command or a sequence of memory commands, in order to preserve error checking data until the memory command or the sequence of memory commands is canceled or completed. According to some embodiments, an error checking data buffer is not released while allocated. Depending on the embodiment, an error checking data buffer may be allocated under at least one of the following conditions: (a) an error checking data read command (e.g., ECC read command) in connection with a RMW command sequence until the end of the RMW command sequence; (b) write canceling/combining for error checking data (e.g., ECC write combining); or (c) memory command selection from a command queue to memory command completion. An error checking data buffer may be allocated to multiple memory commands (e.g., in a command queue) at the same time. For some embodiments, when an error checking data buffer is allocated to multiple memory commands, the error checking data buffer remains allocated until all memory commands allocated to (e.g., targeting) the error checking buffer are complete.

As illustrated, the state diagram 1000 transitions to an "ALLOCATED" state when a memory command targets an error checking data buffer (e.g., ECC data buffer). The error checking data buffer may remain in the "ALLOCATED" state until the error checking data buffer is available (e.g., either "SHARED" or "INVALID" state per the state diagram 900). For some embodiments, a memory controller includes logic that can track all outstanding memory commands in a command queue to an error checking data buffer and that can generate a last memory command complete signal to transition the state diagram 1000 from an "ALLOCATED" state back to an "AVAILABLE" state. For some embodiments, multiple memory commands in a command queue to the same error checking data buffer (except for consecutive read commands) are executed in order. Accordingly, a last memory command logic of the memory controller may use an identifier (ID) of the last memory command issued to find the end of the final memory command to the error checking data buffer.

FIG. 10B is a state diagram 1010 illustrating example state and state transitions for maintaining a "HIT" state or "MISS" state for an error checking data buffer to prioritize the error checking data buffer's availability for release selection. According to some embodiments, the "HIT" state of an error checking data buffer is evaluated when the error checking data buffer is in a "SHARED" state (e.g., per the state diagram 900). The "HIT" state of an error checking data buffer may be evaluated without regard for the current cache state and allocation state of the error checking data buffer (e.g., per the state diagram 900). Depending on the embodiment, the "HIT" state of an error checking data buffer may be evaluated in at least one of the following conditions: (a) a new memory command being placed in a command queue is compared with every error checking data buffer; or (b) a memory command from the command queue targeting the error checking data buffer is compared with every entry in the command queue. The "HIT" state may be independent of the memory command type associated with the "HIT" state. A response to the "HIT" state may be used by the error checking data buffer cache state machine (e.g., the state diagram 900) to determine some state transitions.

Logic of the memory controller may not release an error checking data buffer in the "HIT" state unless none of the other error checking data buffers are in the "INVALID" state or "SHARED" state (e.g., per the state diagram 900).

Error Checking Data Writes

Error checking data writes may be executed following a primary data write command or RMW-write command sequence. The state of an error checking data buffer following the write transaction may be either "MODIFIED" or "PARTIALLY MODIFIED." The error checking write may occur as part of a write command or RMW-write command sequence to the associated primary data address. If the error checking data buffer is in the "MODIFIED" or "PARTIALLY MODIFIED" state and the error checking data buffer is reallocated for a read command, the error checking write may be executed and the error checking data buffer transitioned to the "SHARED" state since an error checking write cannot be generated by the read command.

Error checking data buffers may be allocated for each primary data command. Following the initial transaction or transactions utilizing the error checking data buffer, the error checking data buffer may be in one of several states: (a) "SHARED," (b) "MODIFIED," or (c) "PARTIALLY MODIFIED"

A) In the "SHARED" state, the error checking data buffer contents and memory contents may be the same. The error checking data buffer may be released without any further action required; no write back is required.

B) In the "MODIFIED" state, the error checking data buffer contents may be completely valid, replacing the memory contents. The error checking data buffer may be written back to memory before the error checking data buffer may be released.

C) In the "PARTIALLY MODIFIED" state, the error checking data buffer may contain some valid data and some invalid data. The error checking data buffer may be merged with the memory contents using masked write commands before the error checking data buffer may be reallocated.

The following table explains error checking data buffer error checking write scheduling.

TABLE 3

| Current Memory Command | Next Memory Command in CQ with Same Error Checking Data Address Range | Action | Error Checking Data Buffer State | Comment |
|---|---|---|---|---|
| Read command | Any memory command | None | Shared | Error checking data buffer write commands are not executed following a read command. Error checking data buffer is in the "SHARED" state. |
| Partial write command | None | Error checking data write command | Invalid | If no memory commands in the CQ hit the error checking data buffer, write the error checking data to the memory. |
| Partial write command | Read/RMW Read memory command | Error checking data write command | Invalid | Read command cannot use error checking data in the "PARTIALLY MODIFIED" state. |

TABLE 3-continued

| Current Memory Command | Next Memory Command in CQ with Same Error Checking Data Address Range | Action | Error Checking Data Buffer State | Comment |
|---|---|---|---|---|
| Partial write command | Any write command | None | Partial-Modified | Write error checking data can accumulate in the error checking data buffer for multiple write commands. Accordingly, the error checking data buffer may be reallocated to the write command. No error checking data write may be scheduled. |
| RMW-write command or Write command to entire error checking data buffer range | None | Error checking data write | Shared | If no memory commands in the CQ hit the error checking data buffer, write the error checking data to the memory. |
| RMW-write command or Write command to entire error checking data buffer address range | Read command | Error checking data write command | Shared | Write the error checking data to the memory; the error checking data buffer may remain in "VALID" state for the read command and then transitions to the shared "SHARED" state. |
| RMW-write command or Write command to entire error checking data buffer range | Any write command | None | Modified | Write error checking data can accumulate in the error checking data buffer for multiple write commands. Accordingly, the error checking data buffer may be reallocated to the write command. No error checking data write command may be scheduled. |

Error Checking Data Buffer Structure

As noted herein, some embodiments utilize a plurality of error checking data buffers. Each error checking data buffer in the plurality of error checking data buffers may have an associated error checking data buffer identifier (ID). Depending on the embodiment, each error checking data buffer in the plurality of error checking data buffers may store one or more of the following information:

Primary data address range: store the start address for the primary data memory burst aligned address range (e.g., 8 primary data memory burst aligned address range) that corresponds with the stored error checking data. The error checking data address should be easily calculated based on this address;

Valid bit per byte: the valid bits are effectively mask bits and can be combined with mask bits. These bits are set based on the write address generated from Strategy, write masks, valid bits set based on reads, etc.;

Error checking data (e.g., ECC data): source from ECC reads and data writes;

Error checking data buffer state: indicates the current state of the ECC data buffer: invalid, allocated, shared, modified, partially-modified; and Error checking data buffer hit status: indicates whether any memory commands in the CQ are currently a hit to the error checking data buffer address range.

Error Checking Data Buffer Release

Error checking data may be stored in one or more error checking data buffers (e.g., 8 to 32 buffers). Each error checking data buffer may be initially allocated for a specific memory command and, in some cases, may service other memory commands that hit the same error checking data address range. Once an error checking data buffer services an initial memory command for which it was allocated, it may either remain in the "SHARED" state, be reallocated for a memory command to the same error checking data address range, or be released. When an error checking data buffer is released, it will go to the "INVALID" state.

Some embodiments use an error checking data buffer release algorithm having one or more of the following attributes. The error checking data buffer release algorithm may not release an error checking data buffer when it is currently allocated to a memory command/transaction. The error checking data buffer release algorithm may not allocate all of the error checking data buffers such that any command cannot be selected for execution and get an error checking data buffer assigned. The error checking data buffer release algorithm may release error checking data buffers early enough that an error checking data buffer is available and does not hinder command flow. The error checking data buffer release algorithm may maintain error checking data buffers in "SHARED" state long enough to maximize reuse. Additionally, the error checking data buffer release algorithm may prioritize error checking data buffer release in order to maximize error checking data buffer hits. The error checking data buffer release algorithm may be a linked list, age-based, a priority-based rotation, or random.

The error checking data buffer release algorithm of an embodiment may operate according to one or more of the following rules.

Error checking data buffers in the "ALLOCATED" state may not be released. For a read command, the error checking data buffer is not allocated until the read command is selected for execution. If the read command is a hit to an existing error checking data buffer, the new error checking data buffer allocation and the error checking data read may be canceled at the time of selection. For a write command that does not hit an existing error checking data buffer, the error checking data buffer may not be allocated until the write command is selected for execution. If the write is a hit to an existing error checking data buffer, the new error checking data buffer allocation may be canceled at the time of selection. For an RMW command sequence, the error checking data buffer may be allocated on the RMW-read command sequence and must remain allocated until the RMW-write command sequence.

An error checking data buffer that is in the "modified" or "partially modified" state following a write command or RMW command sequence that is hit by subsequent write command or RMW command sequence (therefore, is not written back to memory) may be retained in the "allocated" state until the subsequent write command or RMW-write command sequence.

The maximum number of error checking data buffers that may be allocated for RMW command sequences at one time may be programmable and may be limited to a subset of the total number of error checking data buffers, which can prevent the possibility of over-allocating the error checking data buffers.

The number of error checking data buffers that may be allocated following a write command or RMW command sequence and hit by a subsequent write command may be limited to prevent over-allocating the error checking data buffers. This may be done in the buffer management logic to determine following a write command or RMW-write command sequence if the error checking data buffer should be written back or allocated to a future write command targeting the same error checking data address range.

The sum of the error checking data buffers allocated as part of an RMW command sequence and error checking data buffers allocated as part of a write command or RMW command sequence that is hit by a subsequent command may be less than the total error checking data buffers to prevent over-allocating the available error checking data buffers.

The number of error checking data buffers in the "SHARED" state may be released immediately.

Error checking data buffers in the "ALLOCATED" state may not be released. Error checking data buffers in the "SHARED-HIT" state may have higher priority over other error checking data buffers for not being released.

In the "MODIFIED" or "PARTIALLY MODIFIED" state, error checking data buffers may transition to the "HIT" state if a write command or RMW command sequence in the command queue hits the same error checking data address range. From this state, error checking data buffers may be allocated and cannot be released until de-allocated.

Error checking data buffers not in either the "ALLOCATED" or "HIT" state, which are in the "SHARED" state, may be in the pool of error checking data buffers that are free to be released.

Error checking data buffers in the "MODIFIED" or "PARTIAL MODIFIED" state and not in the "hit" state may be immediately written back and released following the associated primary data write.

Error checking data buffers in the "PARTIAL MODIFIED" state and hit by a read command or RMW command sequence may be released before the error checking data read for the conflicting command.

On command execution, if no error checking data buffer is in the "INVALID" state, a "SHARED" or "SHARED-HIT" buffer may be immediately released for assignment to the current memory transaction.

FIG. 10C is a state diagram 1020 illustrating example states and state transitions for assignment of an error checking data buffer (e.g., ECC data buffer). According to some embodiments, on every memory command execution, all available error checking data buffers would be in at least one of the following states: INVALID; SHARED; SHARED-HIT; or ALLOCATED (not available). If the current memory command does not hit an existing error checking data buffer, a new error checking data buffer assignment may be performed. The state diagram 1020 illustrates an example round robin algorithm that may be used to select a next error checking data buffer for assignment. As illustrated by the state diagram 1020, the error checking data buffer selection algorithm may comprise: starting from a current state; selecting the next error checking buffer having an "INVALID" state (e.g., per the state diagram 900); if no error checking data buffer has an "INVALID" state, selecting the next error checking data buffer having a "SHARED" state; if no error checking data buffer has a "SHARED" state, selecting the next error checking data buffer having a "SHARED-HIT" state; and if no error checking data buffer has a "SHARED-HIT" state, setting an error interrupt.

Error Checking Data Buffer Identifier (Id)

Each error checking data buffer may have an error checking data buffer identifier (ID). As described herein, when a memory command is selected for execution, the selection logic may issue an error checking data buffer compare request. The error checking data buffer logic may respond with an error checking data buffer ID identifying the error checking data buffer assigned to that memory transaction. The error checking data buffer ID may be used by a strategy execution unit (e.g., 524), the error checking data buffer logic and any other logic that needs to know the error checking data buffer assignment to select the location of the error checking data. The error checking data ID may be used for read data steering and used during write commands to store and fetch the corresponding error checking data. For a command sequence, the error checking data buffer ID may be reused for each memory command in the sequence without additional compare requests.

The error checking data buffer ID may be generated by the error checking data buffer logic based on a compare address and a compare request at command execution. The compare request may be generated for the first command in an atomic sequence. The same error checking data buffer may be used throughout the sequence.

Selection logic may drive the error checking data buffer ID with each command in the sequence to a strategy execution unit (e.g., 524). For an error checking data read command (e.g., ECC read command), the error checking data buffer ID may be sent with the error checking data to the error checking data buffer to load the data in the correct buffer (e.g., 542). For a primary data read command, the error checking data buffer ID may be sent with the read data to a plurality of error checking data buffers (e.g., 542) to pop the associated error checking data from the correct error checking data buffer. For an error checking data write command (e.g., ECC write command), the error checking data buffer ID may be sent to a plurality of error checking data buffers (e.g., 542) to source the error checking data from the correct error checking data buffer for the error checking data write command. For a primary data write command, the error checking data buffer ID may be sent with error checking data generated by the write commands to be stored in the correct error checking data buffer.

Error Checking Data Buffer Write Combining Limit

According to some embodiments, following a write command or RMW command sequence, an error checking data buffer may be in the modified or partially modified state. If the error checking data buffer is a hit to a write command on the command queue and the write command is the first command in the command that hits the error checking data buffer, then the error checking data buffer may be allocated to the subsequent write command and the error checking data write command (e.g., ECC write command) may be canceled. To limit the number of error checking data buffers allocated for write combining/canceling, the maximum number of error checking data buffers that can be allocated in Modified or Partially Modified state may be limited by programming register and a counter implemented in the logic of the error checking data buffers that sums the number of error checking data buffers in this state. Accordingly, for each opportunity to use write combining/canceling, an embodiment may cancel the error checking data write only if the total number of error checking data buffers already allocated for this feature is less than the programmed maximum. If the maximum number of error checking data buffers has already been reached, the error checking data write will occur and the error checking data buffer may transition to the shared state.

Figure 11:
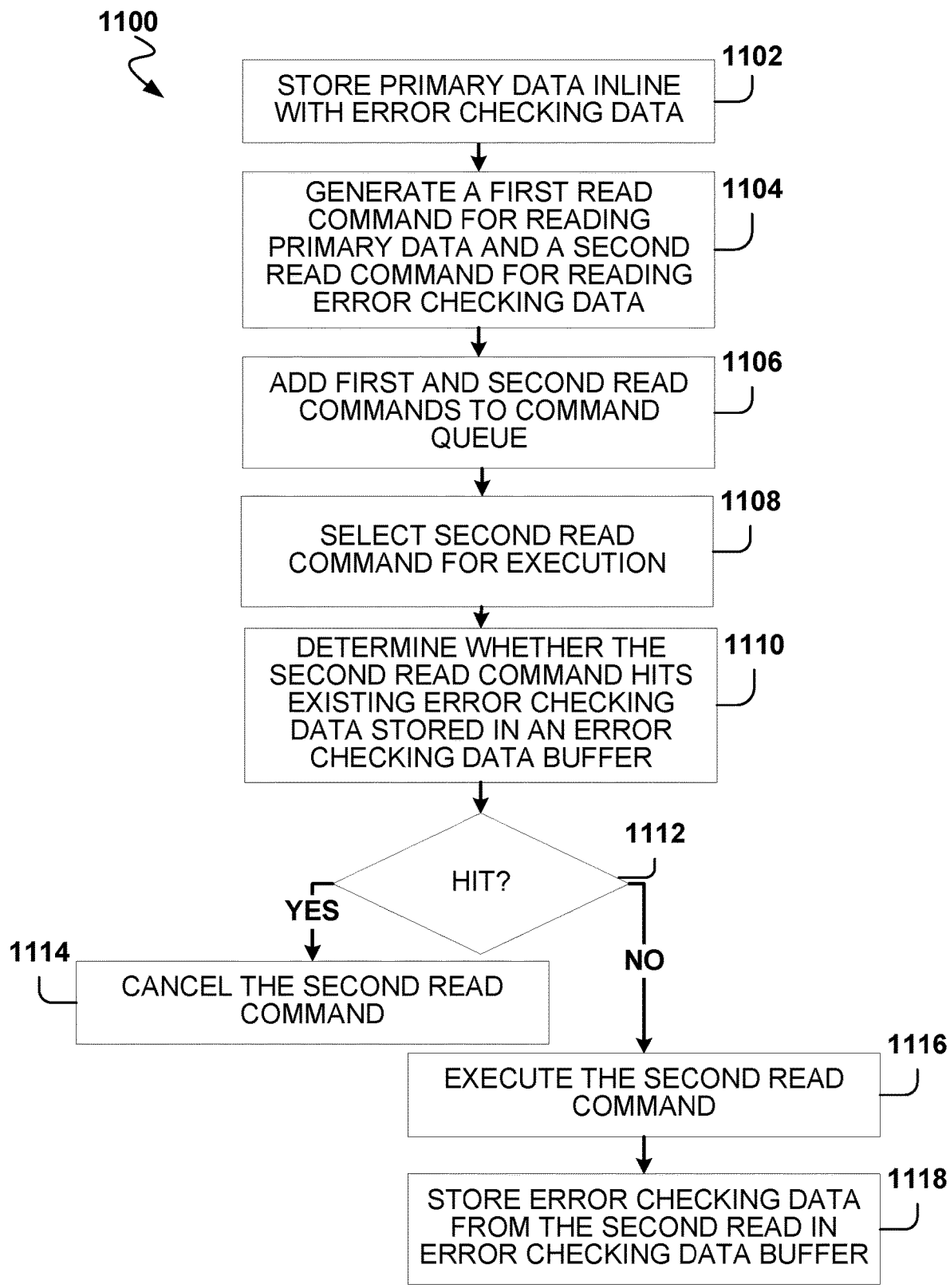
FIG. 11 is a flow diagram illustrating an example method for error checking data caching, in accordance with various embodiments.

FIG. 11 is a flow diagram illustrating an example method 1100 for error checking data caching, in accordance with various embodiments. For some embodiments, the method 1100 is performed by a memory controller of a memory system, such as the memory controller 106 described above with respect to FIG. 1. Though the steps of method 1100 may be depicted and described in a certain order, the order in which the steps are performed may vary between embodiments. For example, a step may be performed before, after, or concurrently with another step. Additionally, the components described below with respect to the method 1100 are merely examples of components that may be used with the method 1100, and other components may also be used in some embodiments.

As shown in FIG. 11, the method 1100 begins at operation 1102, with the memory controller 106 causing primary data to be stored, on a memory, inline with error checking data generated for the primary data using split addressing for memory transactions. The primary data may be stored on the memory at a range of inline primary data addresses, while the error checking data may be stored on the memory at a range of inline error checking data addresses, where the range of inline primary data addresses does not overlap with the range of inline error checking data addresses.

At operation 1104, the memory controller 106 generates, based on a first memory transaction for reading particular primary data stored on the memory, a first read command for reading the particular primary data from the memory and a second read command for reading particular error checking data from the memory. The particular error checking data stored on the memory may be generated for the particular primary data. The first read command and the second read command may comprise memory burst commands.

At operation 1106, the memory controller 106 adds the first read command and the second read command to the command queue of the command queue component 110.

At operation 1108, the memory controller 106 selects for execution, from the command queue of the command queue component 110, the second read command for reading the particular error checking data from the memory.

At operation 1110, the memory controller 106 determines whether the second read command for reading the particular error checking data hits existing error checking data currently stored in an error checking data buffer (e.g., one of the error checking data buffers 112). The memory controller 106 may determine whether the second read command for reading the particular error checking data hits in existing error checking data stored in the error checking data buffer is based on a comparison of inline error checking data addresses. For instance, the comparison may comprise comparing an inline error checking data address associated with the error checking data buffer with an inline error checking data address associated with the second read command (e.g., in the command queue of the command queue component 110). In another instance, the comparison may comprise comparing the inline error checking data addresses in response to detecting a comparison event with respect to the command queue.

In response (decision operation 1112) to the memory controller 106 determining that the second read command for reading the particular error checking data does not hit existing error checking data currently stored in the error checking data buffer, the method 1100 proceeds to operation 1116; otherwise the method 1100 proceeds to operation 1114. At operation 1114, the memory controller 106 cancels the second read command.

At operation 1116, the memory controller 106 executes the second read command to read the particular error checking data from the memory. Then, at operation 1118, the memory controller 106 stores the particular error checking data, read from the memory at operation 1116, in the error checking data buffer (e.g., one of the error checking data buffers 112).

Figure 12:
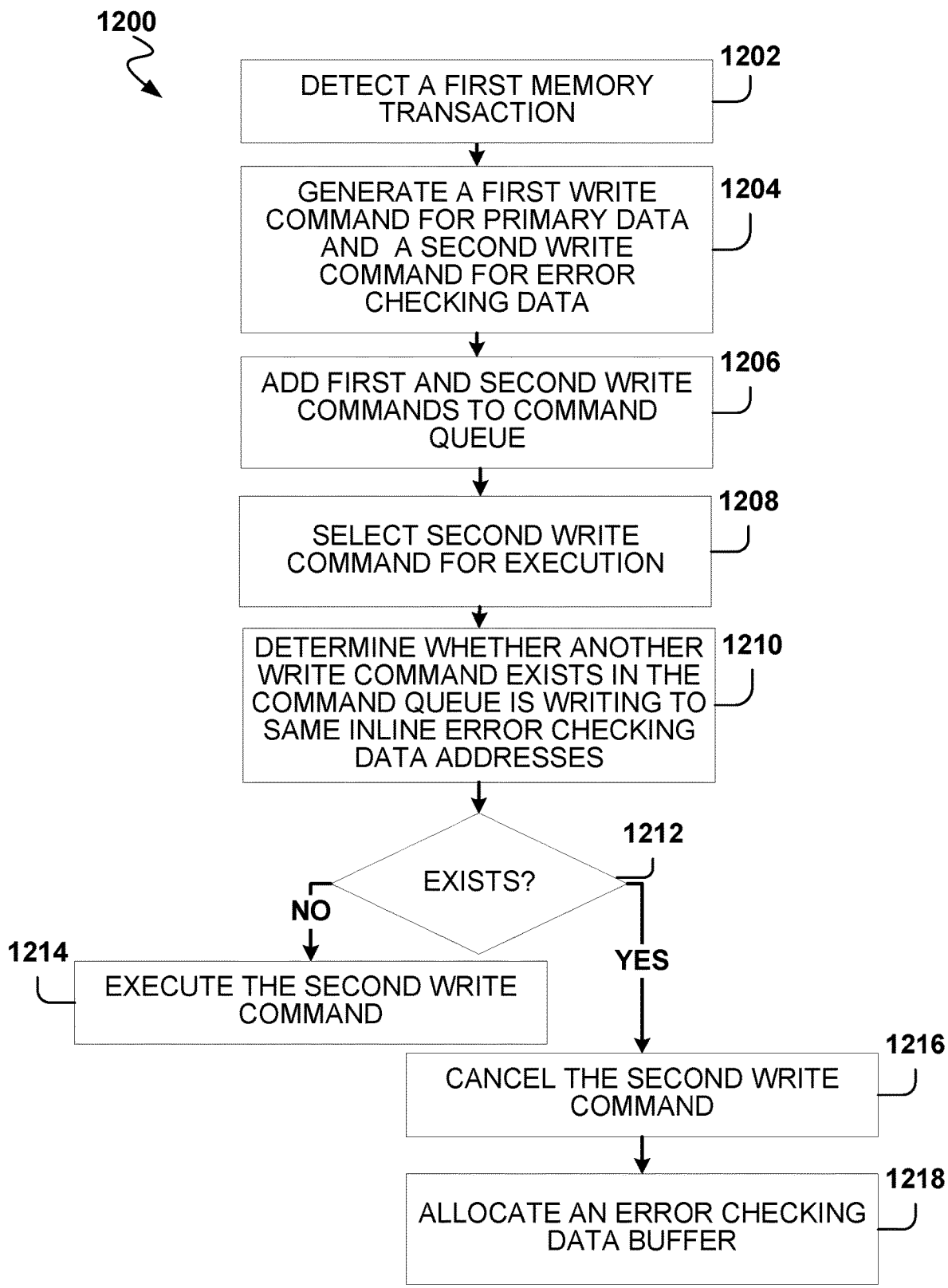
FIG. 12 is a flow diagram illustrating an example method for error canceling/combining write commands for error checking data, in accordance with various embodiments.

FIG. 12 is a flow diagram illustrating an example method 1200 for error canceling/combining write commands for error checking data, in accordance with various embodiments. For some embodiments, the method 1200 is performed by a memory controller of a memory system, such as the memory controller 106 described above with respect to FIG. 1. Though the steps of method 1200 may be depicted and described in a certain order, the order in which the steps are performed may vary between embodiments. For example, a step may be performed before, after, or concurrently with another step. Additionally, the components described below with respect to the method 1200 are merely examples of components that may be used with the method 1200, and that other components may also be used in some embodiments.

As shown in FIG. 12, the method 1200 begins at operation 1202, with the memory controller 106 detecting a first memory transaction for writing particular primary data to a memory that is storing primary data inline with error checking data generated for the primary data. The primary data may be stored on the memory at a range of inline primary data addresses, while the error checking data may be stored on the memory at a range of inline error checking data addresses, where the range of inline primary data addresses does not overlap with the range of inline error checking data addresses. The first write command and the second write command may comprise memory burst commands.

At operation 1204, the memory controller 106 generates, based on the first memory transaction, a first write command for writing the particular primary data to the memory at a subrange of inline primary data addresses and a second write command for writing particular error checking data to the memory at a subrange of inline error checking data addresses. The particular error checking data may be generated for the particular primary data.

At operation 1206, the memory controller 106 adds the first write command and the second write command to the command queue of the command queue component 110.

At operation 1208, the memory controller 106 selects for execution, from the command queue of the command queue component 110, the second write command for writing the particular error checking data to the memory.

At operation 1210, the memory controller 106 determines whether another write command, for writing other error checking data to the memory, exists in the command queue of the command queue component 110, where the other write command writes to a same subrange of inline error checking data addresses as the second write command.

In response (decision operation 1212) to determining that the other write command exists in the command queue, the method 1200 proceeds to operation 1214; otherwise the method 1200 proceeds to operation 1216. At operation 1214, the memory controller 106 executes the second write command.

At operation 1216, the memory controller 106 cancels the second write command to write the particular error checking data to the memory. Then, at operation 1218, the memory controller 106 allocates an error checking data buffer (e.g., one of the error checking data buffers 112) for at least the other write command writing to the same subrange of inline error checking data addresses. For some embodiments, the error checking data buffer remains allocated until no write commands, to the same subrange of inline error checking data addresses, remain in the command queue of the command queue component 110.

Figure 13:
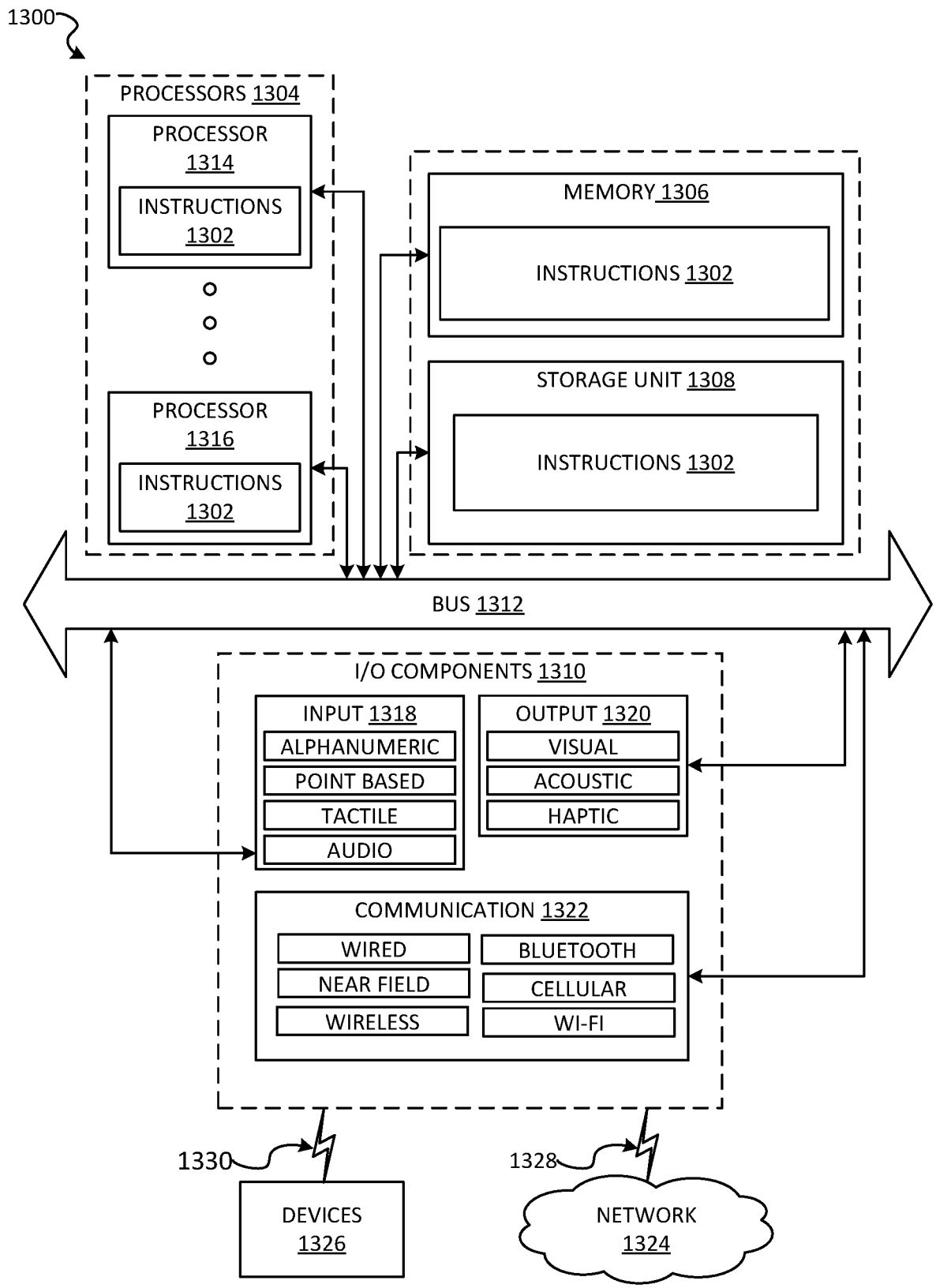
FIG. 13 is a block diagram illustrating components of a machine, according to some example embodiments, able to read instructions from a machine-readable medium (e.g., a machine-readable storage medium) and perform any one or more of the methodologies discussed herein.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a system, within which instructions 1302 (e.g., software, a program, an application, an applet, an app, a driver, or other executable code) for causing the machine 1300 to perform any one or more of the methodologies discussed herein may be executed. For example, the instructions 1302 include executable code that causes the machine 1300 to execute the method 300. In this way, these instructions 1302 transform the general, non-programmed machine 1300 into a particular machine programmed to carry out the described and illustrated method 300 in the manner described herein. The machine 1300 may operate as a standalone device or may be coupled (e.g., networked) to other machines.

By way of non-limiting example, the machine 1300 may comprise or correspond to a computer (e.g., a server computer, a client computer, a personal computer (PC), a tablet computer, a laptop computer, or a netbook), a mobile device, or any machine capable of executing the instructions 1302, sequentially or otherwise, that specify actions to be taken by the machine 1300. Further, while only a single machine 1300 is illustrated, the term "machine" shall also be taken to include a collection of machines 1300 that individually or jointly execute the instructions 1302 to perform any one or more of the methodologies discussed herein.

The machine 1300 may include processors 1304, memory 1306, a storage unit 1308, and I/O components 1310, which may be configured to communicate with each other such as via a bus 1312. In an example embodiment, the processors 1304 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 1314 and a processor 1316 that may execute the instructions 1302. The term "processor" is intended to include multi-core processors 1304 that may comprise two or more independent processors (sometimes referred to as "cores") that may execute instructions contemporaneously. Although FIG. 13 shows multiple processors, the machine 1300 may include a single processor with a single core, a single processor with multiple cores (e.g., a multi-core processor), multiple processors with a single core, multiple processors with multiple cores, or any combination thereof.

The memory 1306 (e.g., a main memory or other memory storage) and the storage unit 1308 are both accessible to the processors 1304 such as via the bus 1312. The memory 1306 and the storage unit 1308 store the instructions 1302 embodying any one or more of the methodologies or functions described herein. The instructions 1302 may also reside, completely or partially, within the memory 1306, within the storage unit 1308, within at least one of the processors 1304 (e.g., within the processor's cache memory), or any suitable combination thereof, during execution thereof by the machine 1300. Accordingly, the memory 1306, the storage unit 1308, and the memory of the processors 1304 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 1302. The term "machine-readable medium" shall also be taken to include any medium, or combination of multiple media, that is capable of storing instructions (e.g., instructions 1302) for execution by a machine (e.g., machine 1300), such that the instructions, when executed by one or more processors of the machine (e.g., processors 1304), cause the machine to perform any one or more of the methodologies described herein (e.g., method 400). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 1310 may include a wide variety of components to receive input, provide output, produce output, transmit information, exchange information, capture measurements, and so on. The specific I/O components 1310 that are included in a particular machine 1300 will depend on the type of the machine 1300. For example, portable machines such as mobile phones will likely include a touch input device or other such input mechanisms, while a headless server machine will likely not include such a touch input device. It will be appreciated that the I/O components 1310 may include many other components that are not specifically shown in FIG. 13. The I/O components 1310 are grouped according to functionality merely for simplifying the following discussion and the grouping is in no way limiting. In various example embodiments, the I/O components 1310 may include input components 1318 and output components 1320. The input components 1318 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components, and the like. The output components 1320 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 1310 may include communication components 1322 operable to couple the machine 1300 to a network 1324 or devices 1326 via a coupling 1328 and a coupling 1330 respectively. For example, the communication components 1322 may include a network interface component or another suitable device to interface with the network 1324. In further examples, the communication components 1322 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1326 may be another machine or any of a wide variety of peripheral devices.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network 1324 (e.g., the Internet) and via one or more appropriate interfaces (e.g., APIs).

Electronic Apparatus and System

Example embodiments may be implemented in digital electronic circuitry, in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice.

Figure 14:
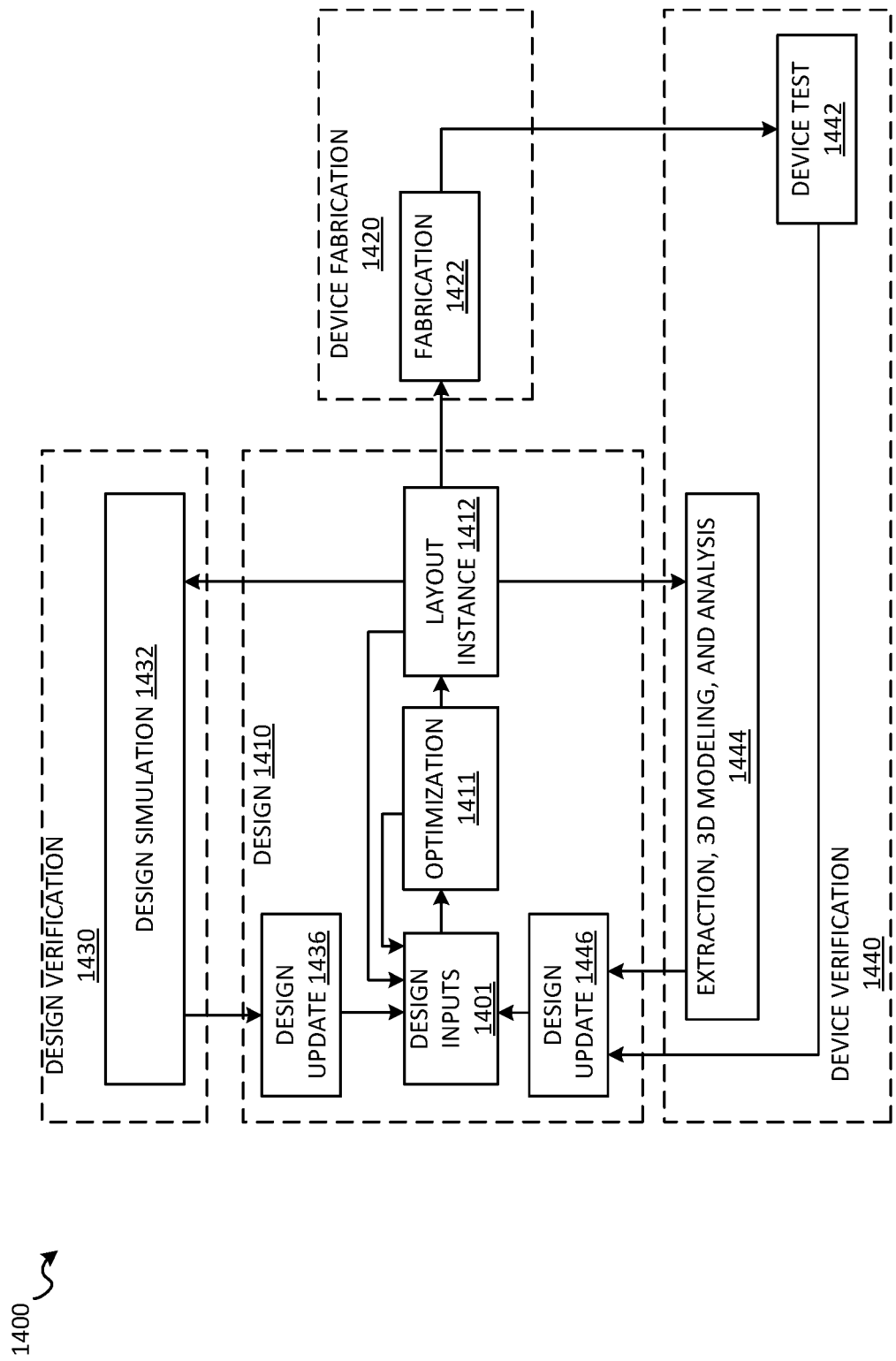
FIG. 14 is a diagram illustrating one possible design process flow for generating a circuit, including embodiments to implement a memory controller that supports primary data stored inline with error checking data as described herein, and in various embodiments, to integrate the memory controller with a larger integrated circuit comprising different design blocks.

FIG. 14 is a diagram illustrating one possible design process flow for generating a circuit, including embodiments to implement a memory controller that supports primary data stored inline with error checking data as described herein, and in various embodiments, to integrate the memory controller with a larger integrated circuit comprising different design blocks. As illustrated, the overall design flow 1400 includes a design phase 1410, a device fabrication phase 1420, a design verification phase 1430, and a device verification phase 1440. The design phase 1410 involves an initial design input operation 1401 where the basic elements and functionality of a device are determined, as well as revisions based on various analyses and optimization of a circuit design. This design input operation 1401 is where instances of an EDA circuit design file are used in the design and any additional circuitry is selected. The initial strategy, tactics, and context for the device to be created are also generated in the design input operation 1401, depending on the particular design algorithm to be used.

In some embodiments, following an initial selection of design values in the design input operation 1401, timing analysis and optimization according to various embodiments occurs in an optimization operation 1411, along with any other automated design processes. One such process may be the automated design of a partitioned root search for error locator polynomial functions in RS FEC decoding. As described below, design constraints for blocks of a circuit design generated with design inputs in the design input operation 1401 may be analyzed using hierarchical timing analysis, according to various embodiments. While the design flow 1400 shows such optimization occurring prior to a layout instance 1412, such hierarchical timing analysis and optimization may be performed at any time to verify operation of a circuit design. For example, in various embodiments, constraints for blocks in a circuit design may be generated prior to routing of connections in the circuit design, after routing, during register transfer level (RTL) operations, or as part of a final signoff optimization or verification prior to a device fabrication operation 1422.

After design inputs are used in the design input operation 1401 to generate a circuit layout, and any optimization operations 1411 are performed, a layout is generated in the layout instance 1412. The layout describes the physical layout dimensions of the device that match the design inputs. This layout may then be used in the device fabrication operation 1422 to generate a device, or additional testing and design updates may be performed using designer inputs or automated updates based on design simulation 1432 operations or extraction, 3D modeling and analysis 1444 operations. Once the device is generated, the device can be tested as part of device test 1442 operations, and layout modifications generated based on actual device performance.

As described in more detail below, design updates 1436 from the design simulation 1432, design updates 1446 from the device test 1442 or the 3D modeling and analysis 1444 operations, or the design input operation 1401 may occur after an initial layout instance 1412 is generated. In various embodiments, whenever design inputs are used to update or change an aspect of a circuit design, a timing analysis and optimization operation 1411 may be performed.

For example, in various embodiments, a user may provide an input to a computing device indicating placement of elements of a circuit within a first portion of a circuit design, including description of circuitry for a partitioned root search for error locator polynomial functions in RS FEC decoding. An output to a display of the computing device may show details of a circuit design, and may further be used to generate results of the timing analysis, or may show recommended optimizations or automatically performed adjustments to the circuit design based on the timing analysis. Further inputs to the computing device may involve adjustments as user design inputs, with additional timing analysis and optimization initiated via user operation of the computing device. In some embodiments, a computing device may be used to generate circuit design files describing circuitry corresponding to embodiments described herein. Such circuit design files may be used as outputs to generate photolithographic masks or other control files and components used to generate circuits that operate in accordance with various embodiments described herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A method comprising:
    storing, on a memory, primary data inline with error checking data generated for the primary, data using split addressing for memory transactions, the primary data being stored on the memory at a range of inline primary data addresses and the error checking data being stored on the memory at a range of inline error checking data addresses, the range of inline primary data addresses not overlapping with the range of inline error checking data addresses;
    generating, based on a first memory transaction for reading particular primary data stored on the memory, a first read command for reading the particular primary data from the memory and a second read command for reading particular error checking data from the memory, the particular error checking data being generated for the particular primary data;
    adding, to a command queue, the first read command and the second read command;
    executing one or more commands from the command queue, the executing the one or more commands comprising:
        selecting for execution, from the command queue, the second read command for reading the particular error checking data;
        determining, based on a comparison of inline error checking data addresses, whether the second read command for reading the particular error checking data hits existing error checking data currently stored in an error checking data buffer, the comparison of inline error checking data addresses comprising comparing an inline error checking data address associated with the second read command with an inline error checking data address associated with the error checking data buffer; and
        in response to determining that the second read command for reading the particular error checking data does not hit existing error checking data currently stored in the error checking data buffer:
            executing the second read command to read the particular error checking data from the memory; and
            storing, in the error checking data buffer, the particular error checking data read from the memory.

2. The method of claim 1, wherein the executing the one or more commands from the command queue further comprise:
    in response to determining that the second read command for reading the particular error checking data does hit existing error checking data currently stored in the error checking data buffer, canceling the second read command.

3. The method of claim 1; wherein the executing the one or more commands from the command queue further comprises:
    selecting for execution, from the command queue, the first read command for reading the particular primary data from the memory; and
    executing the first read command to read the particular primary data from the memory.

4. The method of claim 1, wherein the error checking data comprises error correcting code (ECC).

5. The method of claim 1; wherein the first read command and the second read command comprise memory burst commands.

6. The method of claim 1, wherein
    the comparing the inline error checking data addresses is performed in response to detecting a comparison event with respect to the command queue.

7. The method of claim 6, wherein the comparison event comprises placement of a new command in the command queue.

8. The method of claim 1, wherein the second read command corresponds to a subrange of inline error checking data addresses and the second read command comprises a plurality of read commands in response to the subrange of inline error checking data addresses crossing a boundary between two subranges of inline error checking data addresses.

9. A method comprising:
    detecting a first memory transaction for writing particular primary data to a memory that is storing primary data inline with error checking data generated for the primary data, the primary data being stored on the memory at a range of inline primary data addresses and the error checking data being stored on the memory at a range of inline error checking data addresses, the range of inline primary data addresses not overlapping with the range of inline error checking data addresses;
    generating, based on the first memory transaction, a first write command for writing the particular primary data to the memory at a subrange of inline primary data addresses and a second write command for writing particular error checking data to the memory at a subrange of inline error checking data addresses, the particular error checking data being generated for the particular primary data;

adding, to a command queue; the first write command and the second write command;

executing one or more commands from the command queue, the executing the one or more commands comprising:
- selecting for execution, from the command queue, the second write command for writing the particular error checking data;
- determining whether another write command, for writing other error checking data to the memory, exists in the command queue, the other write command writing to a same subrange of inline error checking data addresses as the second write command; and
- in response to determining that the other write command exists in the command queue; canceling the second write command for writing the particular error checking data.

10. The method of claim 9, wherein the executing the one or more commands from the command queue further comprises:
- in response to determining that the other write command exists in the command queue, allocating an error checking data buffer for at least the other write command that is writing to the same subrange of inline error checking data addresses.

11. The method of claim 10, wherein the error checking data buffer remains allocated until no write commands, to the same subrange of inline error checking data addresses, remain in the command queue.

12. The method of claim 9, wherein the error checking data comprises error correcting code (ECC).

13. The method of claim 9, wherein the first write command and the second write command comprise memory burst commands.

14. A memory controller comprising:
- an error checking buffer; and
- a command queue component for providing a command queue that stores a plurality of memory commands, generated by the memory controller, for timely execution by the memory controller;
- wherein the memory controller uses split addressing to generate memory commands for memory transactions with respect to a memory, the memory controller causes the memory to store primary data inline with error checking data generated for the primary data, the primary data is stored on the memory at a range of inline primary data addresses, the error checking data is stored on the memory at a range of inline error checking data addresses, and the range of inline primary data addresses does not overlap with the range of inline error checking data addresses, and the memory controller performs operations comprising:
  - generating, based on a first memory transaction for reading particular primary data stored on the memory, a first read command for reading the particular primary data from the memory and a second read command for reading particular error checking data from the memory, the particular error checking data being stored on the memory and being generated for the particular primary data;
  - adding, to the command queue, the first read command and the second read command;
  - executing one or more commands from the command queue, the executing the one or more commands comprising:
    - selecting for execution, from the command queue, the second read command for reading the particular error checking data;
    - determining, based on a comparison of inline error checking data addresses, whether the second read command for reading the particular error checking data hits existing error checking data currently stored in an error checking data buffer, the comparison of inline error checking data addresses comprising comparing an inline error checking data address associated with the second read command with an inline error checking data address associated with the error checking data buffer; and
    - in response to determining that the second read command for reading the particular error checking data does not hit existing error checking data currently, stored in the error checking data buffer:
      - executing the second read command to read the particular error checking data from the memory; and
      - storing, in the error checking data buffer, the particular error checking data read from the memory.

15. The memory controller of claim 14, wherein the executing the one or more commands from the command queue further comprises:
- in response to determining that the second read command for reading the particular error checking data does hit existing error checking data currently stored in the error checking data buffer, canceling the second read command.

16. The memory controller of claim 14, wherein the memory controller performs operations further comprising:
- generating, based on a second memory transaction for writing specific primary data to the memory; a first write command for writing the specific primary data to the memory at a subrange of inline primary data addresses and a second write command for writing specific error checking data to the memory at a subrange of inline error checking data addresses; the specific error checking data being generated for the specific primary data; and
- adding, to the command queue, the first write command and the second write command;
- wherein the executing the one or more commands from the command queue further comprises:
  - selecting for execution, from the command queue, the second write command for writing the specific error checking data;
  - determining whether another write command; for writing other error checking data to the memory, exists in the command queue, the other write command writing to a same subrange of inline error checking data addresses as the second write command; and
  - in response to determining that the other write command exists in the command queue, canceling the second write command for writing the specific error checking data.

17. The memory controller of claim 16, wherein the executing the one or more commands from the command queue further comprises:
- in response to determining that the other write command exists in the command queue, allocating an error checking data buffer for at least the other write command that is writing to the same subrange of inline error checking data addresses.

18. The memory controller of claim 14, wherein the error checking data comprises error correcting code (ECC).

19. The memory controller of claim 14, wherein the first read command and the second read command comprise memory burst commands.

20. The memory controller of claim 14, wherein the comparing the inline error checking data addresses is performed in response to detecting a comparison event with respect to the command queue, the comparison event comprises placement of a new command in the command queue.

* * * * *